US009642428B2

(12) United States Patent
Brown et al.

(10) Patent No.: US 9,642,428 B2
(45) Date of Patent: May 9, 2017

(54) HYBRID FRAME SLEEVE CASE

(71) Applicant: Incase Designs Corp., Chino, CA (US)

(72) Inventors: Jonathan Brown, Monrovia, CA (US);
Hyun Hong, Los Angeles, CA (US);
Allen Min Choi, Union City, CA (US)

(73) Assignee: Incase Designs Corp., Chino, CA (US)

( * ) Notice: Subject to any disclaimer, the term of this patent is extended or adjusted under 35 U.S.C. 154(b) by 24 days.

(21) Appl. No.: 14/673,495

(22) Filed: Mar. 30, 2015

(65) Prior Publication Data

US 2015/0272303 A1 Oct. 1, 2015

Related U.S. Application Data

(60) Provisional application No. 61/972,137, filed on Mar. 28, 2014.

(51) Int. Cl.
*A45C 11/00* (2006.01)

(52) U.S. Cl.
CPC ......... *A45C 11/00* (2013.01); *A45C 2011/003* (2013.01); *Y10T 29/49826* (2015.01)

(58) Field of Classification Search
CPC ........ A45C 2005/035; A45C 2005/032; A45C 2011/003; A45C 2011/2013; A45C 2011/025; A45C 3/02; A45C 3/001; A45C 3/06; B65D 81/022; B65D 81/025; B65D 81/05; B65D 81/053; B65D 81/057

USPC .................................................. 150/147, 149
See application file for complete search history.

(56) References Cited

U.S. PATENT DOCUMENTS 8,186,514 B2 * 5/2012 Bowers ................ A45C 7/0095
206/320
2012/0037285 A1 2/2012 Diebel et al.
2013/0175186 A1 7/2013 Simmer

FOREIGN PATENT DOCUMENTS

JP 2014154878 8/2014

OTHER PUBLICATIONS

Internation Search Report and Written Opinion, PCT Application PCT/US2015/023391, Jul. 28, 2015, 10 pages.

* cited by examiner

*Primary Examiner* — Anthony Stashick
*Assistant Examiner* — Mollie Impink
(74) *Attorney, Agent, or Firm* — Aka Chan LLP

(57) ABSTRACT

A sleeve case is for a portable electronic device (e.g., laptop computer or electronic tablet device) and includes neoprene or fabric panels attached to an elastic polymer frame, such as ethylene vinyl acetate (EVA). The elastic polymer frame extends around a perimeter of the sleeve to provide cushioning or padding for side edges of the sleeve. A magnetic or other latching mechanism is used to secure an opening on one side of the sleeve.

129 Claims, 24 Drawing Sheets

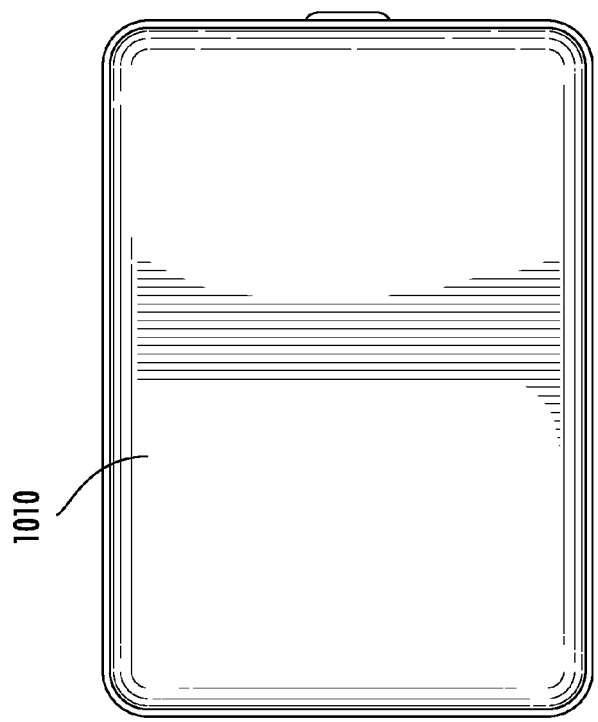
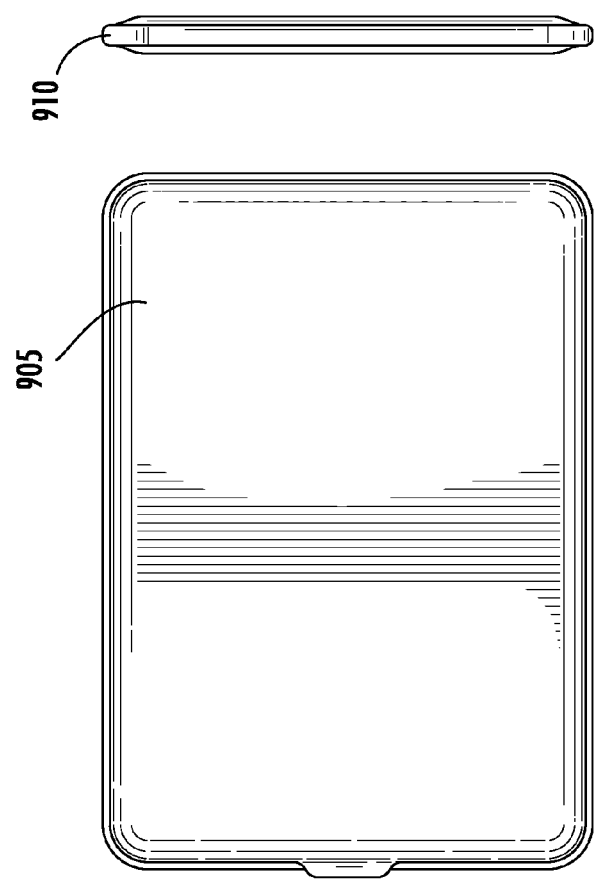
FIG. 10C
FIG. 10B
FIG. 10A

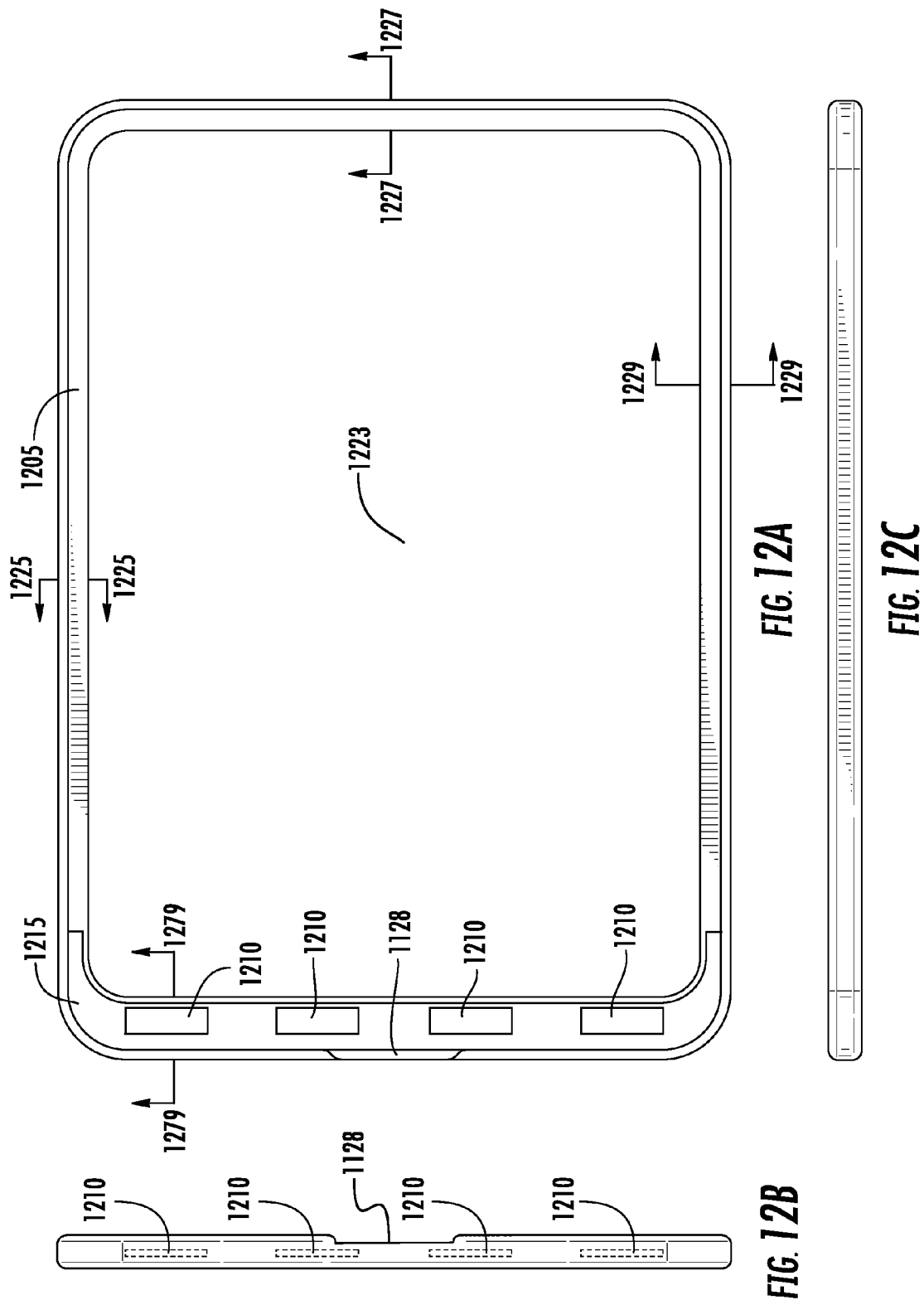

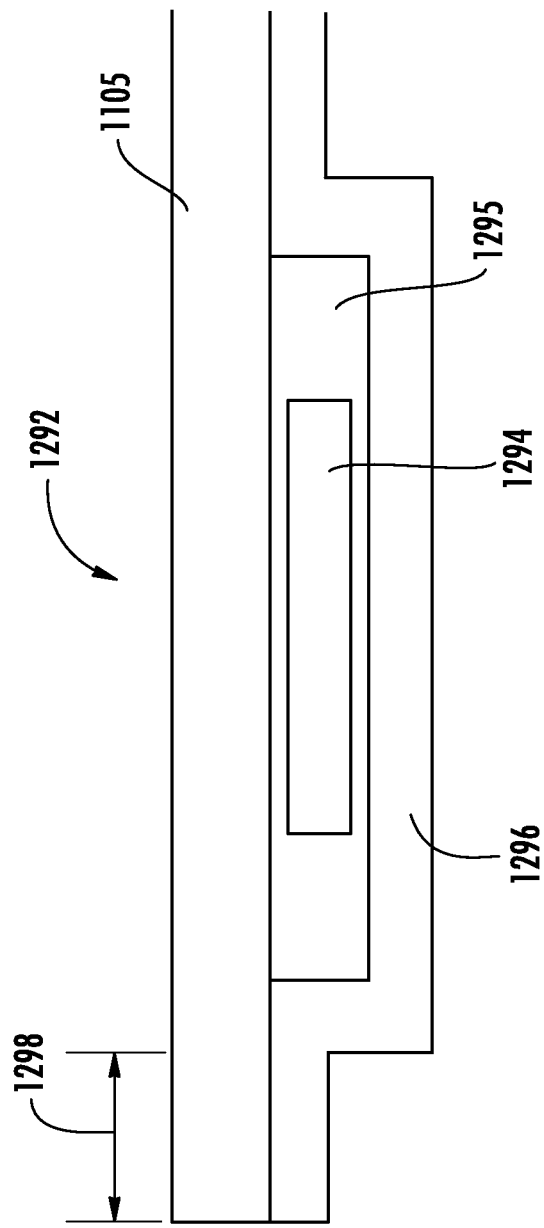

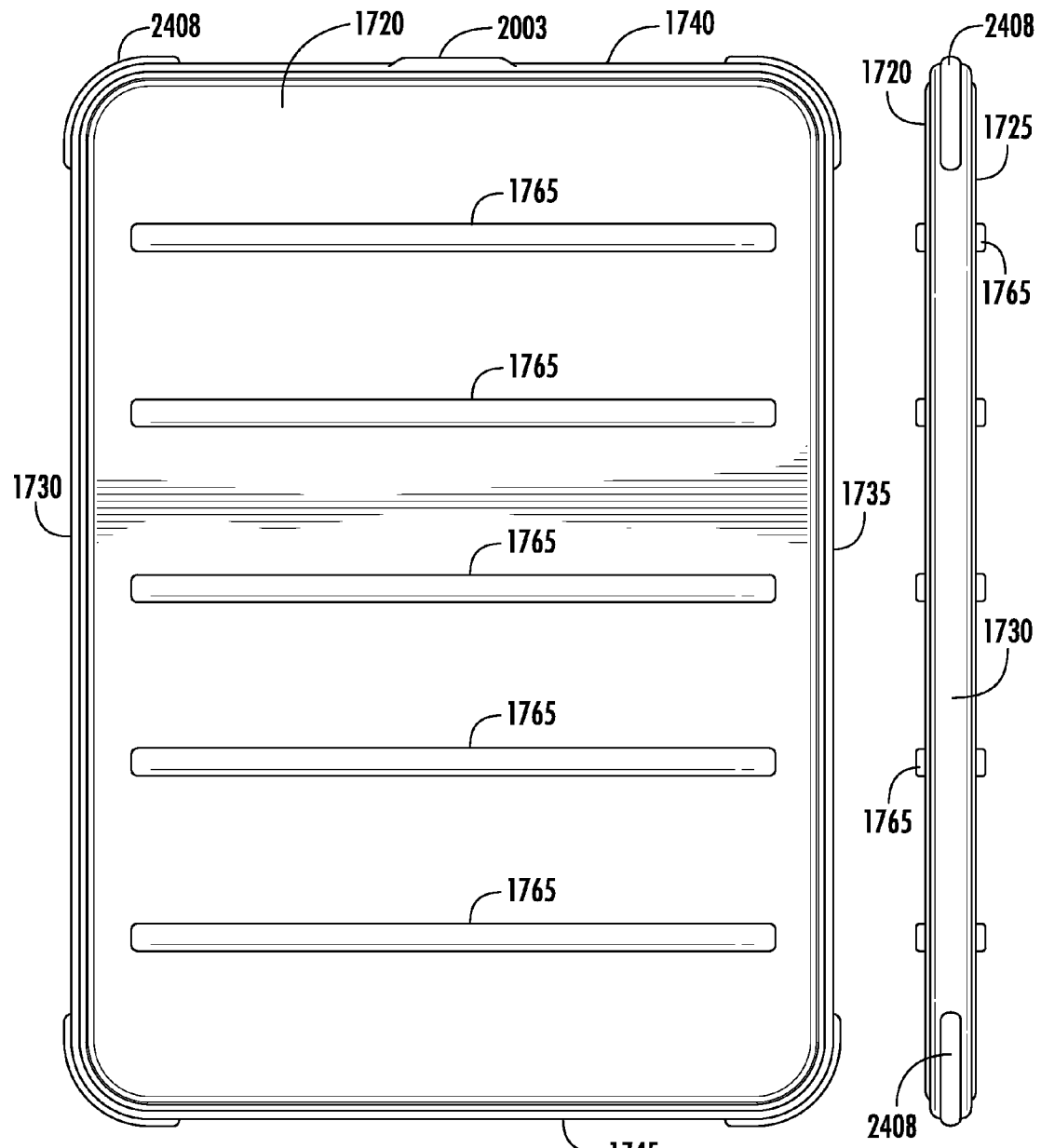

HYBRID FRAME SLEEVE CASE

CROSS-REFERENCE TO RELATED APPLICATIONS

This patent application claims the benefit of U.S. patent application 61/972,137, filed Mar. 28, 2014, which is incorporated by reference along with all other references cited in this application.

BACKGROUND OF THE INVENTION

This invention relates to accessories for electronic devices and more specifically to cases for portable electronic devices and electronic tablets.

With each new generation, portable electronic devices provide greater functionality and have more capabilities. These portable electronic devices allow people to play and record music, send and receive e-mail, send text messages, browse Web pages, make phone calls, play and record video, take and view pictures, edit documents, and much more. These devices continue to revolutionize the way people interact, learn, connect with other people, conduct business, and find things. They help people manage their daily lives and can be a source of entertainment. These devices can be used to store valuable information including personal information (e.g., phone numbers, financial information, private photos or videos, and favorite music tracks).

Typically these devices are intended to be carried or moved about. As such, these devices are more vulnerable to damage as compared to nonportable devices such as desktop computers. These devices are more likely to be accidentally dropped, hit, or scratched. Some types of damage may be cosmetic (e.g., scratch). However, other types of damage may ruin or limit the functionality of the device. Often these devices contain sensitive and fragile components (e.g., screen, camera lens, flash, processors, storage drives, accelerometers, and sensors). Accidentally dropping the device could render various features unusable.

Protective cases are used to protect these devices from possible damage. Therefore, there is a need for cases for portable electronic devices that will protect the devices.

BRIEF SUMMARY OF THE INVENTION

A sleeve case is for a portable electronic device (e.g., laptop computer or electronic tablet device) and includes neoprene or fabric panels attached to an elastic polymer frame, such as ethylene vinyl acetate (EVA). The elastic polymer frame extends around a perimeter of the sleeve to provide cushioning or padding for side edges of the sleeve. A magnetic or other latching mechanism is used to secure an opening on one side of the sleeve.

Incase Designs Corp. of Chino, Calif. is a manufacturer of cases for electronic devices including electronic tablet devices. The Incase Web site is www.goincase.com, which is incorporated by reference along with all product packaging and documentation as of the filing date of this application.

In a specific implementation, the case or sleeve is for a portable electronic device such as a tablet such as Apple iPad products including the iPad Air and iPad mini or notebook computer products including the Apple MacBook and MacBook Air product, described at the Apple Web site, www.apple.com, which is incorporated by reference in this application.

A sleeve case has a rectangular shape, with two longer sides and two shorter sides, and rounded corners. There is an opening for the sleeve on one of the shorter sides of the sleeve. This opening is secured by a magnetic latch mechanism. The sleeve includes front and back neoprene panels. These are attached to an elastic polymer or rubber frame (e.g., EVA frame) by sewing (e.g., needle and thread) or other technique (e.g., glue, epoxy, welding, or fusing). The frame extends along all sides of the sleeve, which provide cushioning and protection for the sides of the case.

In an implementation, a case for a portable electronic device includes: a frame structure including a frame border having an exterior edge and interior edge, the exterior and interior edges being separated by a frame border width, where the frame structure comprises a first material, and the interior edge surrounds a perimeter of a compartment for the portable electronic device; a first side panel, attached to a first side of the frame border, where the first side panel includes a second material, different from the first material; a second side panel, attached to a second side of the frame border, where the second panel includes the second material, and the first material is more shock absorbing than the second material.

The sides of the portable electronic device are cushioned against side impacts by the first material having a thickness of the frame border width. The greater the thickness of the frame border, the greater the shock absorbing capability of the case, but also the size of the case will be larger. The first material can be foam rubber. The first material can be ethylene vinyl acetate and the second material can be neoprene.

In an implementation, a case for a portable electronic device includes an ethylene vinyl acetate (EVA) frame includes: a first side, second side, third side, and fourth side, where the first side is adjacent to the second and fourth sides, and opposite of the third side, the second side is adjacent to the first and third sides, and opposite of the fourth side, the second side is longer than the first side. A cross section of the second side includes a first portion extending in a first direction and a second portion extending in a second direction, transverse to the first direction. The first portion includes an exterior side and an interior side, and the first portion has a first length from a first end to a second end in the first direction. The second portion is attached to the interior side of the first portion, at a point between the first and second ends, and extends in the second direction away from the first portion a second length.

The case includes a compartment, enclosure, or space formed by the first, second, third, and fourth sides, where first and third sides of the compartment are bounded by the first and third sides that extend in the second direction. Second and fourth sides of the compartment are bounded by the second and fourth sides that extend a third direction, transverse to the second direction.

The case includes a first neoprene panel, attached (e.g., via stitching or an adhesive) to a first side of the EVA frame. The case includes a second neoprene panel, attached to a second side of the EVA frame. The second side of the EVA is opposite of the first side, and the compartment (which will hold the device to be protected by the case) is bounded on opposite sides by the first and second neoprene panels.

In various implementations, the second length is greater than the first length. A cross section of the first side includes a third portion extending in the first direction and a fourth portion extending in a third direction, transverse to the first direction. The third portion includes an exterior side and an interior side. The fourth portion is attached to the interior side of the third portion, at a point between the third and fourth ends, and extends in the third direction away from the third portion a third length. The third length can be greater than the second length.

The fourth portion can include a recessed region that can be shaped to hold a magnet. The third portion has a fourth length from a third end to a fourth end in the first direction, and the fourth length can be greater than the first length. The third portion has a fourth length from a third end to a fourth end in the first direction, and the fourth length can be the same as the first length.

The compartment is an enclosed space that retains (and protects) the portable electronic device. The case can include a first latching mechanism, attached to the second neoprene panel and a second latching mechanism, attached to the first side of the EVA frame, where the second latching mechanism is adapted to mate with the first latching mechanism. An opening to the compartment is open when the first and second latching mechanisms are unlatched. The opening to the compartment is closed when the first and second latching mechanisms are latched together.

The case can include a first latching mechanism, attached to the second neoprene panel and a second latching mechanism, attached to the second side of the EVA frame, where the second latching mechanism is adapted to mate with the first latching mechanism. An opening to the compartment is open when the first and second latching mechanisms are unlatched. The opening to the compartment is closed when the first and second latching mechanisms are latched together.

The latching mechanism can be magnetic. A first magnetic latch portion is attached to the second neoprene panel. A second magnetic latch portion is attached to the EVA frame. An opening to the compartment is open when the first and second magnetic latches are separated from each other. The opening to the compartment is closed when the first and second magnetic latches are latched together via magnetic attraction.

The first neoprene panel can be sewn to the first side of the EVA frame, and the second neoprene panel is sewn to the second side of the EVA frame.

In an implementation, a method includes: providing a frame structure for a portable electronic device having a frame border with an exterior edge and interior edge, where frame structure is made of first material; separating the exterior and interior edges by a frame border width; using the interior edge of the frame structure to surround a perimeter of a compartment for the portable electronic device; attaching a first side panel to a first side of the frame border, where the first side panel is made of a second material, different from the first material; and attaching a second side panel to a second side of the frame border, where the second panel is made of the second material, and the first material is more shock absorbing than the second material. The sides of the portable electronic device are cushioned against side impacts by the first material having a thickness of the frame border width.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 10A-10C show the front, side, and back of the hybrid sleeve.
FIGS. 12A-12C show front, side, and bottom views of the elastic polymer frame.
FIG. 12F shows a cross section of a portion of a panel of the case.
FIGS. 17-24 show another implementation of a hybrid sleeve case.

DETAILED DESCRIPTION OF THE INVENTION

Figure 1:
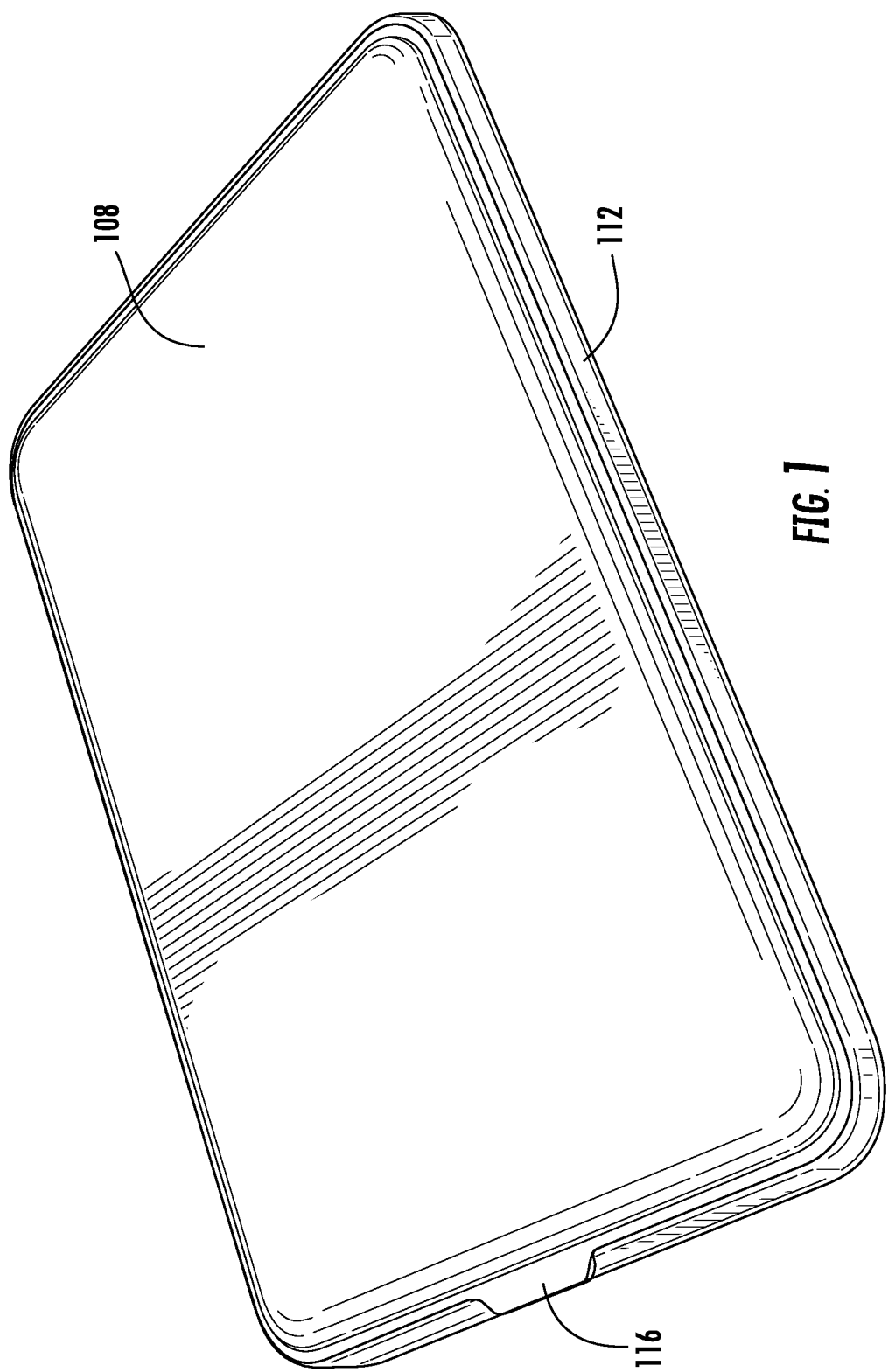
FIGS. 1-2 show hybrid frame sleeve cases.
Figure 2:
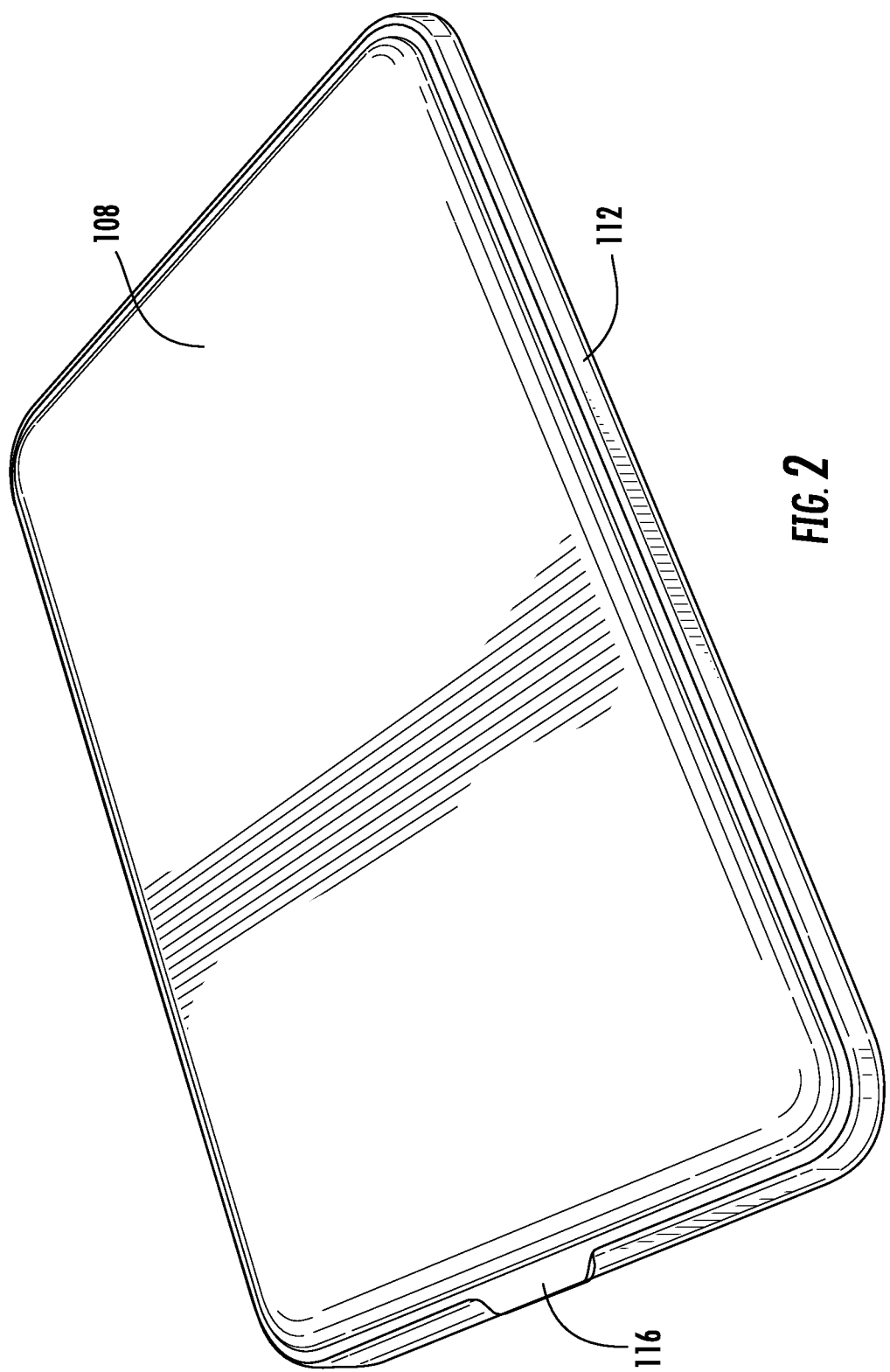

FIGS. 1-2 show hybrid frame sleeve cases. The case is neoprene sleeve for an electronic device such as laptop or tablet computer. The sleeve includes a neoprene front panel 108 and back panel (not shown), and an ethylene vinyl acetate (EVA) frame 112 along an edge of the sleeve. The EVA frame extends around the perimeter of the sleeve and gives additional protection for the contents of the case. The device slips in from one side of the sleeve, opened by using a tab 116, and snaps shut through magnets (not shown).

A case as described in this application may be referred to as a sleeve, portfolio, a portable electronic device enclosure, wallet, container, folder, folding case, pocketbook, folding pocketbook, box, jacket, or envelope. The case may include one or more pockets. The pockets can be used to hold pens, pencils, papers, business cards, credit cards, money, accessories for the portable electronic device (e.g., stylus), and so forth. A sleeve, frame, or both as described in this application may be referred to as a portable electronic device holder, enclosure, container, or receptacle.

A specific implementation of the case is the ICON Sleeve™ with TENSAERLITE™ by Incase Designs Corp. The ICON Sleeve provides evolved protection for electronic devices including ultrabooks, laptop computers, and tablet devices. Shock-absorbing Tensaerlite protection technology means maximum protection with minimal weight. And with easy access to all ports, you can charge your device while you protect it. Our Icon Sleeve is lightweight, durable, and made to last. The case may also be referred to by other name (e.g., Impact Sleeve™ or Halo Flex™).

The ICON Sleeve is designed to protect devices and the information stored on the devices, including data, media, videos, pictures, contents, and ideas. The ICON Sleeve provides device security, structure for enhanced support of the device, lightweight impact absorption, and is durable.

FIG. 1 shows the sleeve in a first color scheme in black neoprene with a black EVA frame. Another color scheme is black neoprene with a gray or slate frame. FIG. 2 shows the sleeve in a second color scheme in gray neoprene with a yellow EVA frame. Other color schemes can also be used for the sleeve.

The color of the frame may be a neon- or fluorescent-type color, such as a yellow or yellow-green color (may be referred to as lumen color). Neon colors for frame will outline the case in a bright color, which allows the case to be more easily visible in low light or dark conditions. The frame can also be embedded with reflective material or glow-in-the-dark material. This also allows the case to be more easily visible in low light or dark conditions. In a darkened conference room or meeting hall, this can help a person locate the case and also help prevent others from stepping on the case.

Figure 3:
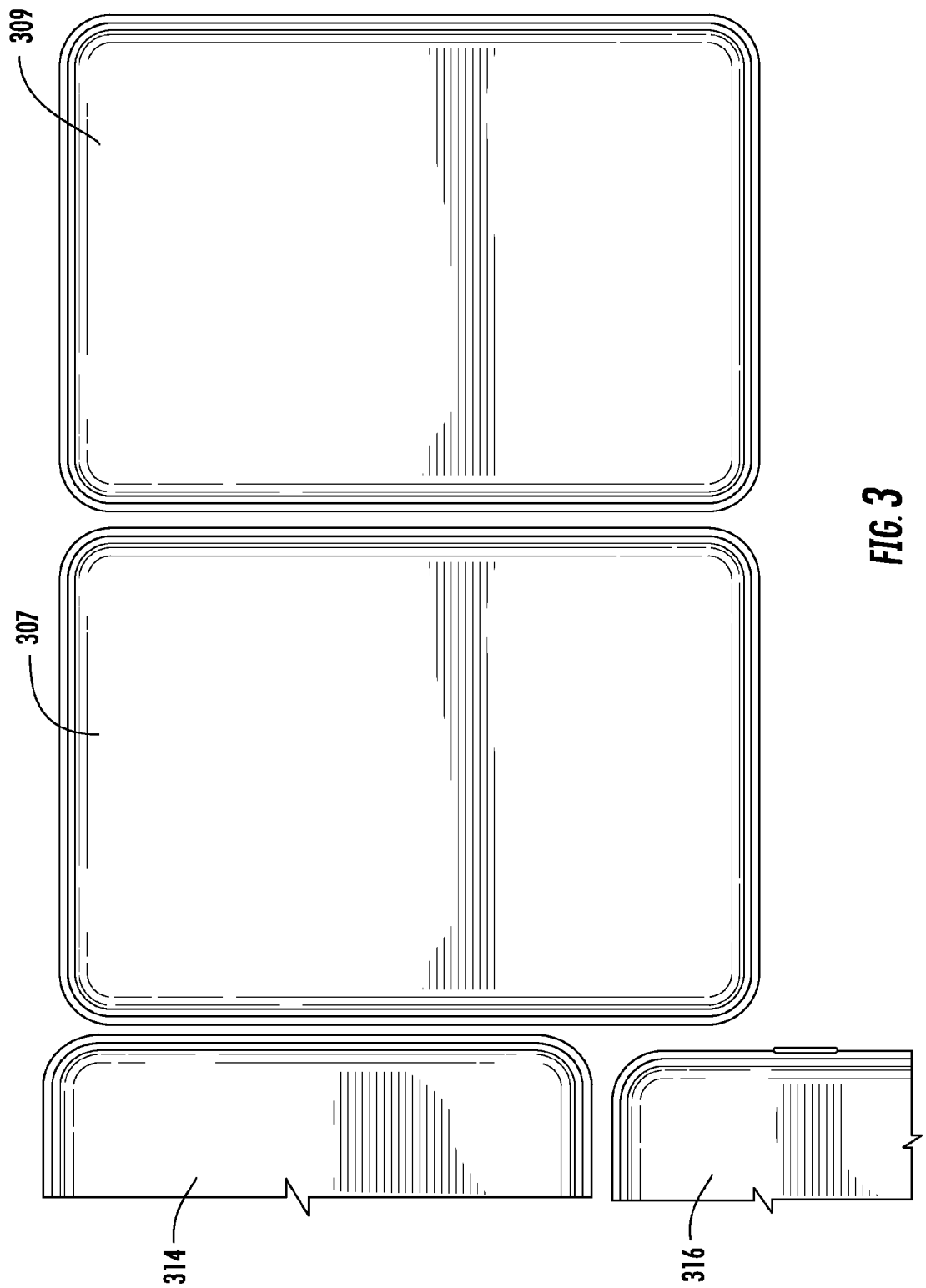
FIG. 3 shows a top view of various sizes of hybrid frame sleeve cases.

FIG. 3 shows a top view of various sizes of hybrid frame sleeve cases. In various implementations, the sleeve is sized appropriately for laptop and tablet computers. For further examples, the hybrid sleeve can have dimensions appropriate for an Apple MacBook product (e.g MacBook Pro or MacBook Air) or similar laptop computer. Sleeves 307 and 309 are for a MacBook product with a 13-inch screen size. The hybrid sleeve can have dimensions appropriate for an Apple iPad product (e.g., Apple iPad, iPad Air, or iPad mini) or similar tablet computer. Sleeves 314 and 316 are for an iPad Air product.

The actual dimensions of the device can vary to accommodate different purposes, including the different sizes and dimensions of electronic devices being housed. Table A below lists some examples of approximate hybrid sleeve dimensions for various MacBook and iPad products.

TABLE A

| Product | Hybrid Sleeve Dimensions (mm) |
| --- | --- |
| Apple iPad Mini | 240.0 × 166.2 × 10.0 |
| Apple iPad Air | 280.0 × 201.0 × 10.0 |
| Apple MacBook Retina 13" | 355.0 × 250.0 × 12.0 |
| Apple MacBook Retina 15" | 399.9 × 278.1 × 13.0 |

Table B below lists some further examples of approximate hybrid sleeve dimensions for various MacBook and iPad products.

TABLE B

| Product | Hybrid Sleeve Dimensions (mm) |
| --- | --- |
| Apple iPad Mini or Mini with Retina Display | 241.3 × 152.4 × 12.7 |
| Apple iPad Air | 279.4 × 203.2 × 12.7 |
| Apple MacBook Air 11" | 334.0 × 235.0 × 12.0 |
| Apple MacBook Air 13" | 355.6 × 266.7 × 12.7 |
| Apple MacBook Pro Retina 13" | 355.6 × 254.0 × 12.7 |
| Apple MacBook Retina 15" | 406.4 × 279.4 × 12.7 |

In an implementation, the case is for a tablet computer, tablet PC, or other tablet-type electronic device. Some examples of electronic tablets include Dell Venue, HP Slate, HP ElitePad, Toshiba Excite or Thrive, Fujitsu Stylistic, Lenovo IdeaPad, Lenovo Yoga, Lenovo Miix, Amazon Kindle, Sony Reader, Sony Xperia, Barnes & Noble Nook, Microsoft Surface, Microsoft Surface Pro, Samsung Galaxy Tab, Google Nexus, Motorola Xoom, Asus Transformer, Asus MeMO, ASUS VivoTab, and others.

The hybrid sleeve design described in this patent can also be used for other devices. For example, the hybrid sleeve can also be used for products such as an Apple iPod product (e.g., iPod Classic, iPod Touch, iPod Nano, or iPod Shuffle) or similar media player devices. Aspects of the invention are also applicable to other types of devices including smartphones (such as the Apple iPhone and Google Android phones), personal digital assistants (PDAs), handheld computers, notebook or laptop computers, and cameras. Any trademarks listed in this patent application are the property of their respective owners.

Portable electronic device are valuable because their functionality, the information they contain, and time and expense to replace. A case is typically much easier and less expensive to replace than the device which it houses and protects.

A case protects the portable electronic device from scratches, dings, dents, and other damage. The case also provides shock absorption. The case will absorb impacts, preventing shock to the components of the device which are often delicate. The case can also improve the grip to the device and case combination. The case may include a texture pattern, be made from a tacky material, or have a tacky coating, or include a shoulder, wrist, or neck strap. The case may also be waterproof or water resistant to protect the device from rain, snow, and surf.

A texture pattern can be incorporated into the panels or frame, or both, of the case. The texture pattern can be for aesthetics or grip, or a combination. For example, the texture pattern can help hide scratches, scuffs, fingerprints, oil, and other imperfections that may occur to a panel or the frame. For neoprene or other woven or fabric panels, the panel will have a woven texture. For other types of panels or for the frame, the texture can be imprinted or molded into the material.

In an implementation, a mold for the frame includes an inverse or reverse texture, which results in the frame bumper (e.g., exterior side surface of the bumper) becoming molded with the texture. The frame bumper texture can be a pebbled or another pattern, which will appear in relief (e.g., raised) on the frame bumper surface. The frame can be textured using other patterns, such as a waffle pattern or tire thread, which results in the pattern appearing debossed, indented, sunken, or carved into the frame bumper surface.

A case is typically an important accessory for the device that it protects. For example, a person might accidentally drop a portable electronic device in the case on the floor when running to catch a flight for a business trip at the airport. The case may cushion the drop, thus preventing major damage to the portable electronic device. The portable electronic device will remain intact and unbroken, saved by the case. The person can pick up the portable electronic device, continue on the flight, and use the portable electronic device on the business trip.

If the portable electronic device had not been protected by a case, the portable electronic device might have become broken. The screen may become cracked or there might have been other damage rendering the device inoperable. The person typically would not have been able to replace the portable electronic device soon enough, especially if there was important information saved on the portable electronic device (e.g., sales presentation slides) that are needed for the business trip.

Figure 4:
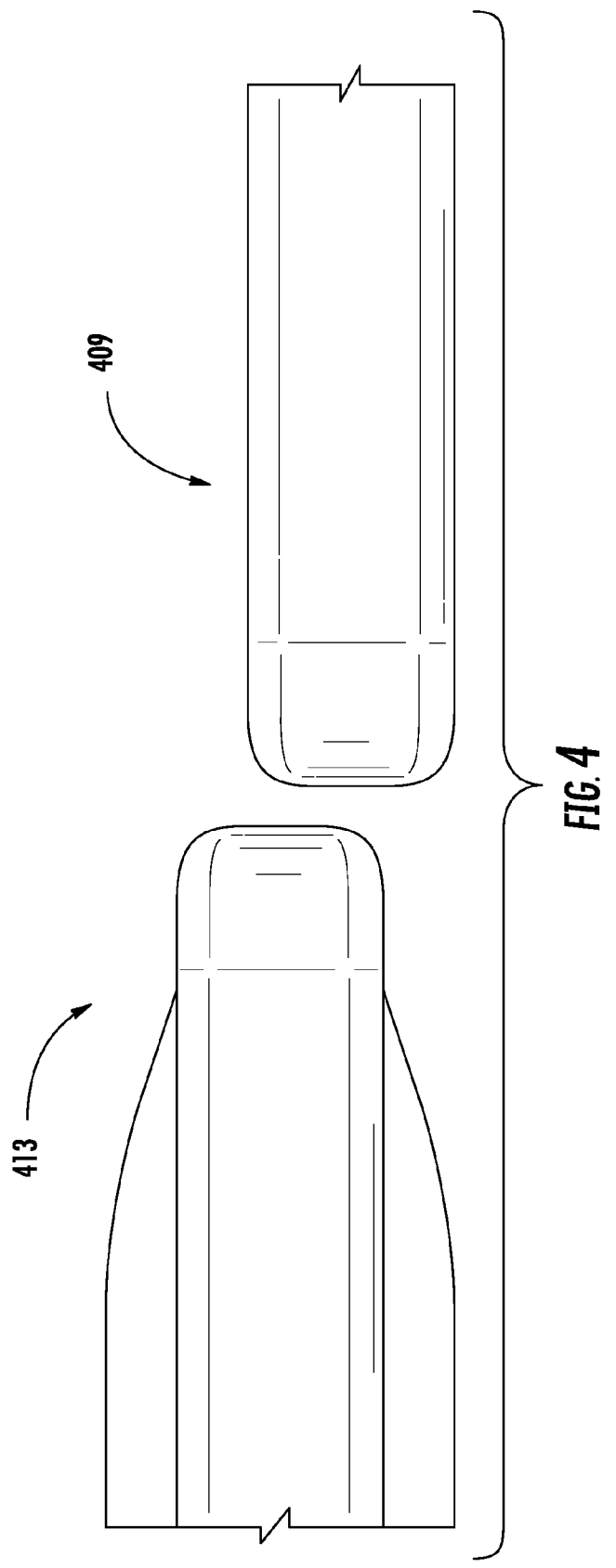
FIG. 4 shows side views for two hybrid sleeves.

FIG. 4 shows side views for two hybrid sleeves. A sleeve 409 is for a MacBook 13-inch product and is empty. A sleeve 413 is for the MacBook 13-inch product and has the product in the sleeve. Sleeve 413 is thicker than sleeve 409 because the product is in the sleeve.

The dimensions of the sleeve may be less or about the same as the item to be placed into the enclosed or protective space or compartment of the sleeve. The panels of the sleeve and frame can stretch around the item placed inside the sleeve. Typically the panels stretch more than the frame, and the sleeve holds the item (e.g., laptop computer or tablet device) in place in the sleeve by compression. For example, the two panels are positioned on opposite sides of the device and hold the device so that the frame is positioned against the sides of the device. This ensures the sides of device are protected against side impacts by the frame bumper.

Table C below provides a comparison of the hybrid sleeve approximate thickness for various products with and without the device.

TABLE C

| Product | Thickness (mm, no device) | Thickness (mm, with device) |
|---|---|---|
| Apple iPad Mini | 10 | 14 |
| Apple iPad Air | 10 | 14 |
| Apple MacBook Retina 13" | 12 | 26 |
| Apple MacBook Retina 15" | 13 | 26 |

Figure 5:
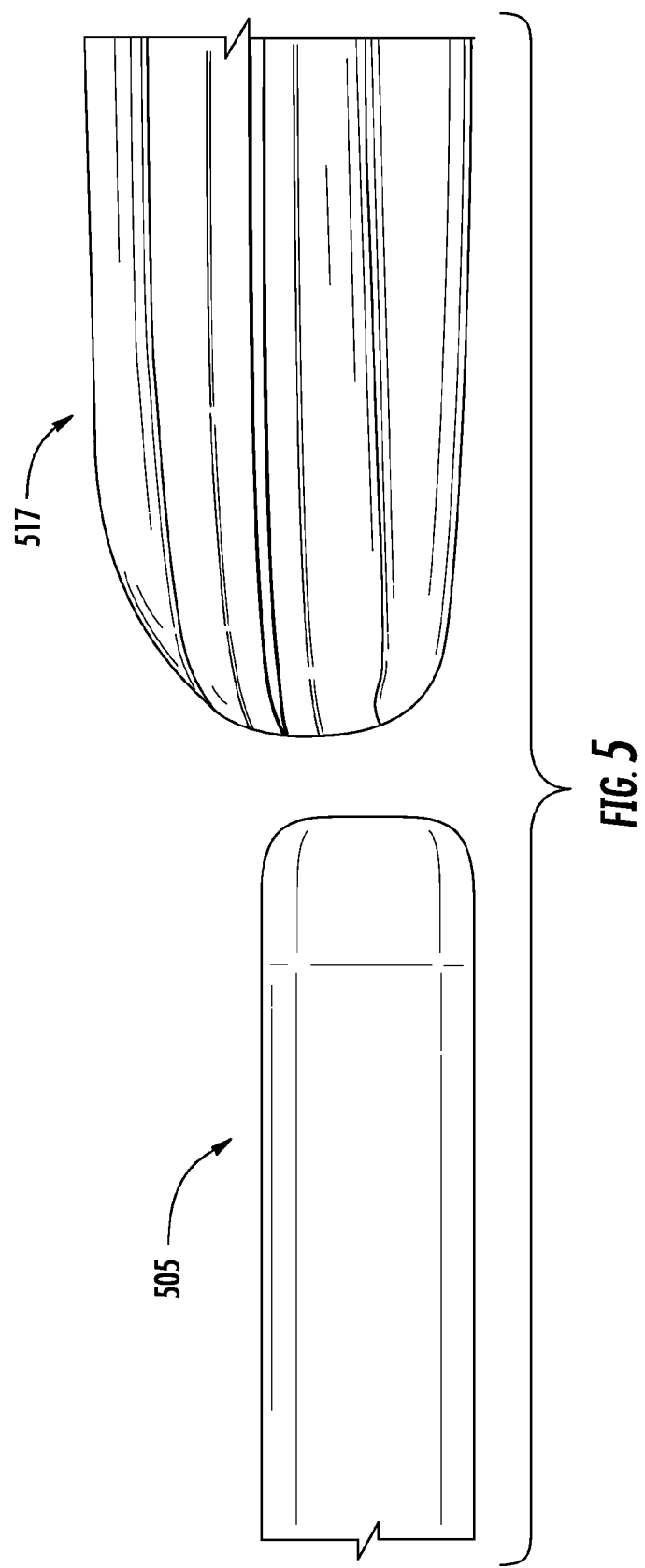
FIG. 5 side views of a hybrid sleeve and neoprene sleeve, which does not have the elastic polymer frame.

FIG. 5 side views of a hybrid sleeve 505 and neoprene sleeve 517, which does not have the EVA frame. Both sleeves are empty. Neoprene sleeve 517 is a Neoprene Classic sleeve by Incase for the Apple MacBook 13-inch is about 25 millimeters without the device. This sleeve expands to 32 millimeters with the device. Hybrid sleeve 505 is also the Apple MacBook 13-inch.

The hybrid sleeve is thinner (about 12 millimeters) than the neoprene sleeve without the EVA frame (about 25 millimeters). In this particular example, the reduction in thickness is more than 50 percent.

The hybrid sleeve also weighs less than the neoprene sleeve without the EVA frame. To provide an example, a hybrid sleeve with frame for the Apple MacBook 13-inch weighs about 195 grams (empty) while sleeve without frame for the Apple MacBook 13-inch weighs about 272 grams (empty). In this particular example, the reduction in weight is more than 25 percent (e.g., about 28 percent).

Figure 6:
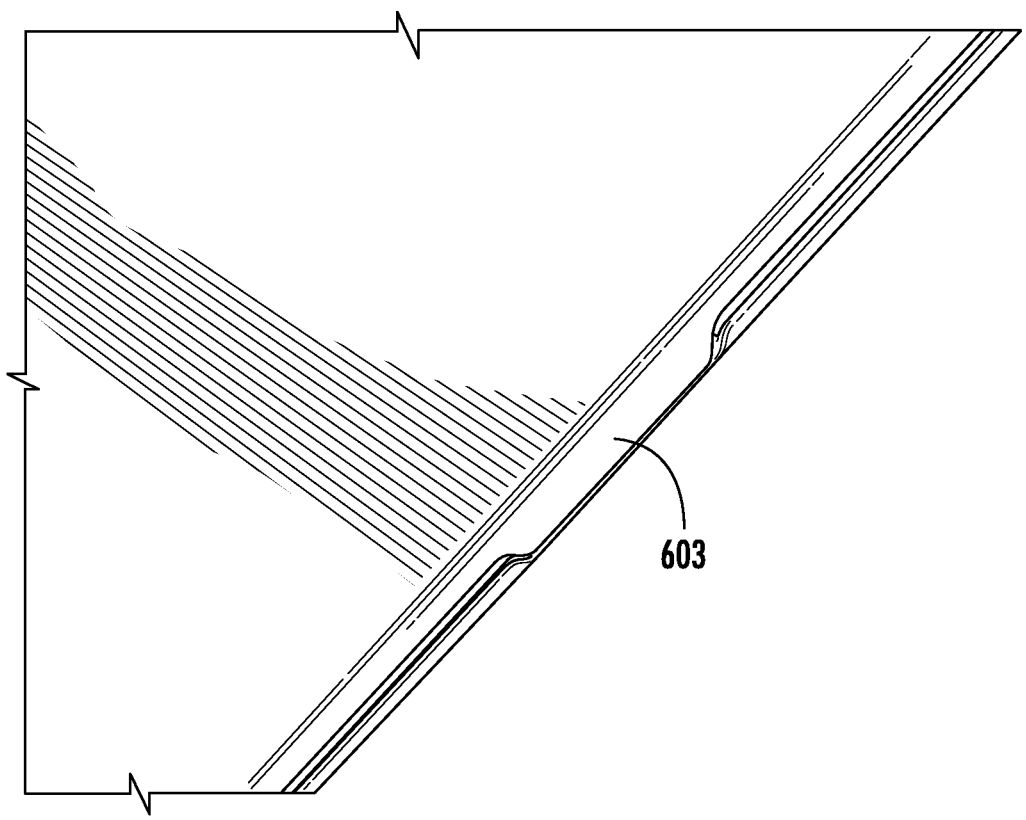
FIG. 6 shows a close-up view of an opening tab of a hybrid sleeve.

FIG. 6 shows a close-up view of a tab 603 of a hybrid sleeve. This tab is an extension of the neoprene material and is used to open and close the side opening of the sleeve.

Figure 7:
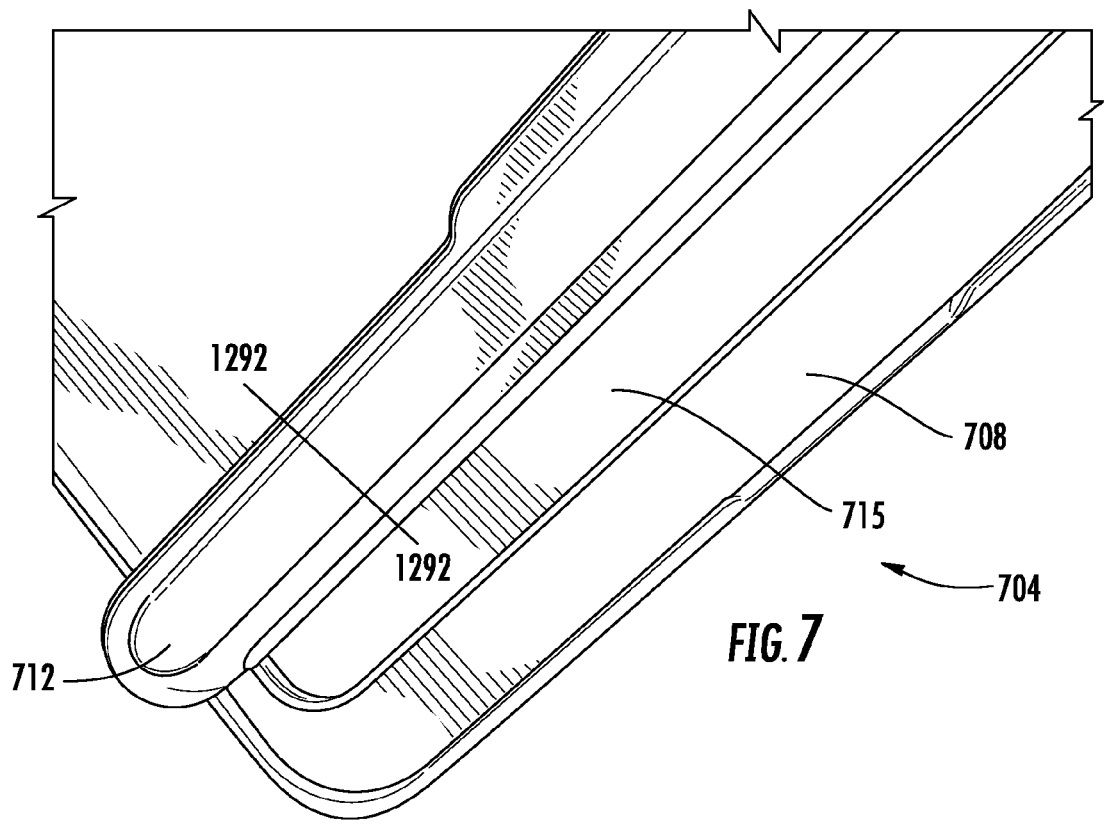
FIG. 7 shows an opening for the hybrid sleeve.

FIG. 7 shows an opening 704 of the hybrid sleeve. The EVA frame is covered with a material 708, which covers magnets. On the neoprene side, there is a bar 712, which is attached to the neoprene material. Underneath bar 712 are a plastic bar and magnets. The magnets under bar 712 align with those under material 708, to hold the sleeve closed. There is a faux fur lining 715 on the inside of sleeve.

Figure 8:
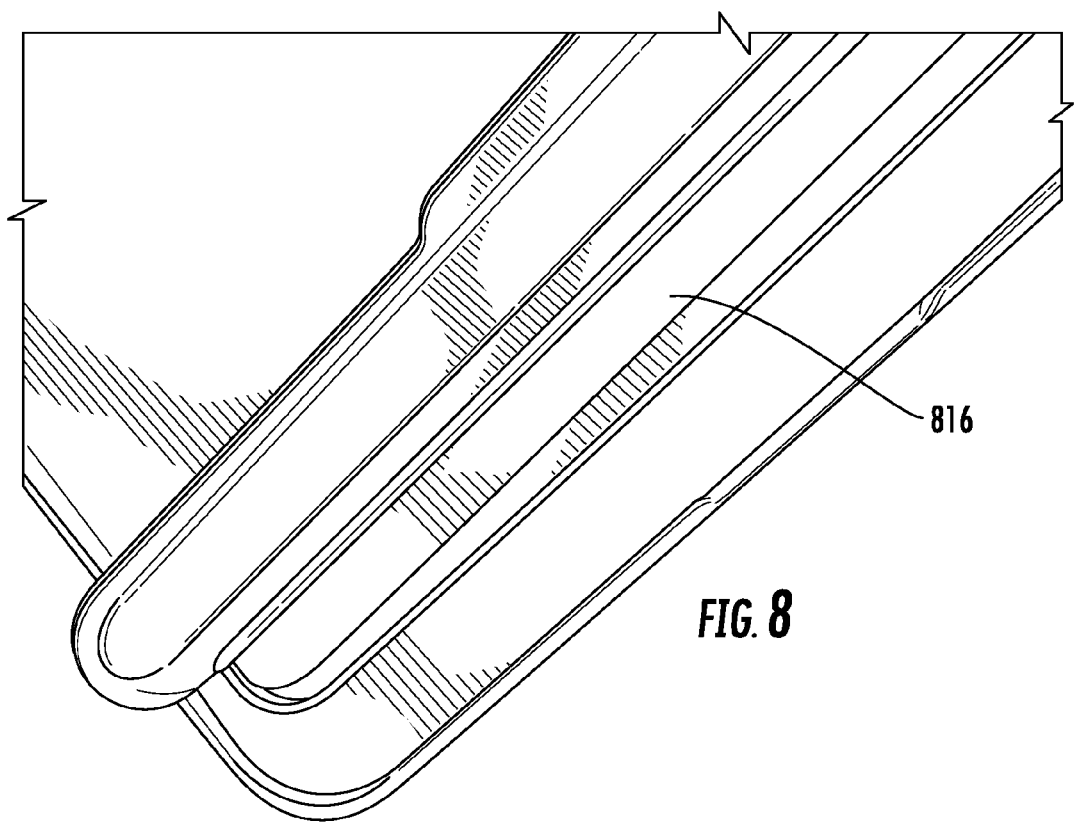
FIG. 8 shows a laptop computer positioned inside the sleeve.

FIG. 8 shows a laptop computer 816 (e.g., MacBook) positioned inside the sleeve.

Figure 9:
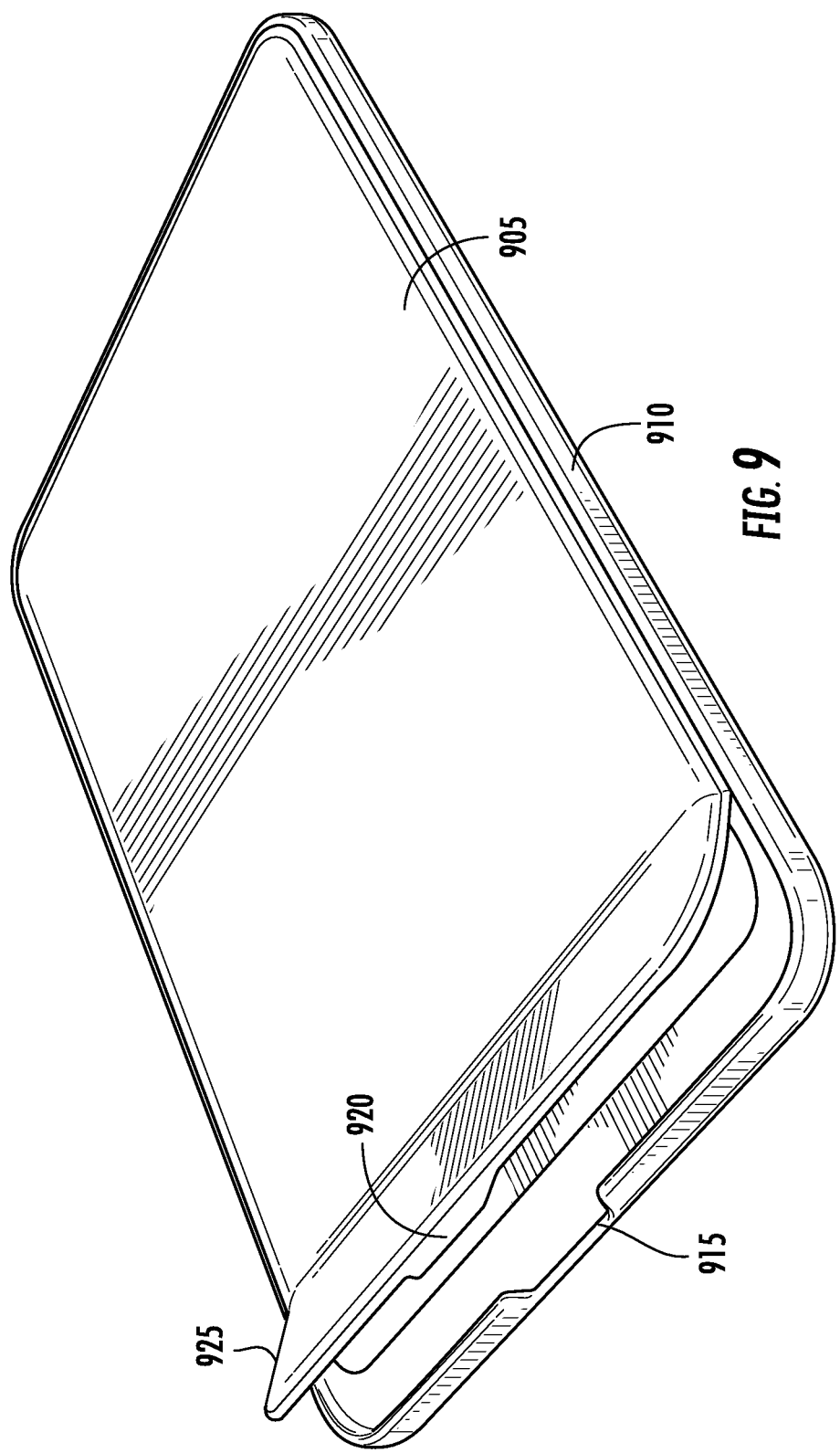
FIG. 9 shows a hybrid frame sleeve case with an overview of the features of the sleeve.

FIG. 9 shows an overview of the features of a hybrid frame sleeve case. FIGS. 10A-10C show the front, side, and back of the hybrid sleeve. The sleeve has neoprene panels on the front 905 and back 1010. As an option, there can be a screen printed logo (not shown) on the front neoprene panel 905. For example, the logo can indicate the branding or manufacturer of the sleeve.

The sleeve has an EVA protective frame 910 that extends around a perimeter of the sleeve. There is a tab cut out 915 in the EVA frame that is positioned opposite a tab 920 of the front neoprene panel. The tab is to allow easier opening of the front panel, so a user can access the opening in the sleeve by which the device can be inserted or removed.

The opening of hybrid sleeve is a magnetic opening 925. There are magnets that are attached to the neoprene sleeve, and magnets attached to the frame, which cooperate together to hold the opening flap closed. For the magnetic latch, both sides (neoprene and EVA sides) can include magnets for the magnetic latch. Alternatively, only a single side (neoprene or EVA side) can have the magnet, while the other side includes a metal plate (e.g., iron sheet) or other magnetic material which the magnet can be attracted to. The magnet, on one side, will be attracted to the metal plate, on the other side, to keep the opening of the hybrid sleeve closed.

In the implementation of FIGS. 9 and 10A-10C, the front panel (e.g., with the logo) has an opening for inserting a device into the protective compartment, while the back panel (e.g., without a logo) does not have an opening. In other implementations, the front panel (e.g., with the logo) does not have an opening while the back panel (e.g., without the logo) has an opening. In an implementation, both the front and back panels have openings; these openings can be on the same side or different sides (e.g., opposite sides) of the case.

Further, the opening in FIGS. 9 and 10A-10C is shown as being on the shorter side of the case. In other implementations, such as shown in FIGS. 13-16F, the opening can be on longer side of the case. In an implementation, a case can have openings on both shorter and longer sides, such as shorter side opening for the front panel and longer side opening for the back panel.

In FIG. 9, the inner panels that cover the magnets of the frame (e.g., material 708 in FIG. 7) and inner lining (e.g., lining 715 in FIG. 7) of the sleeve are not shown.

Figure 11:
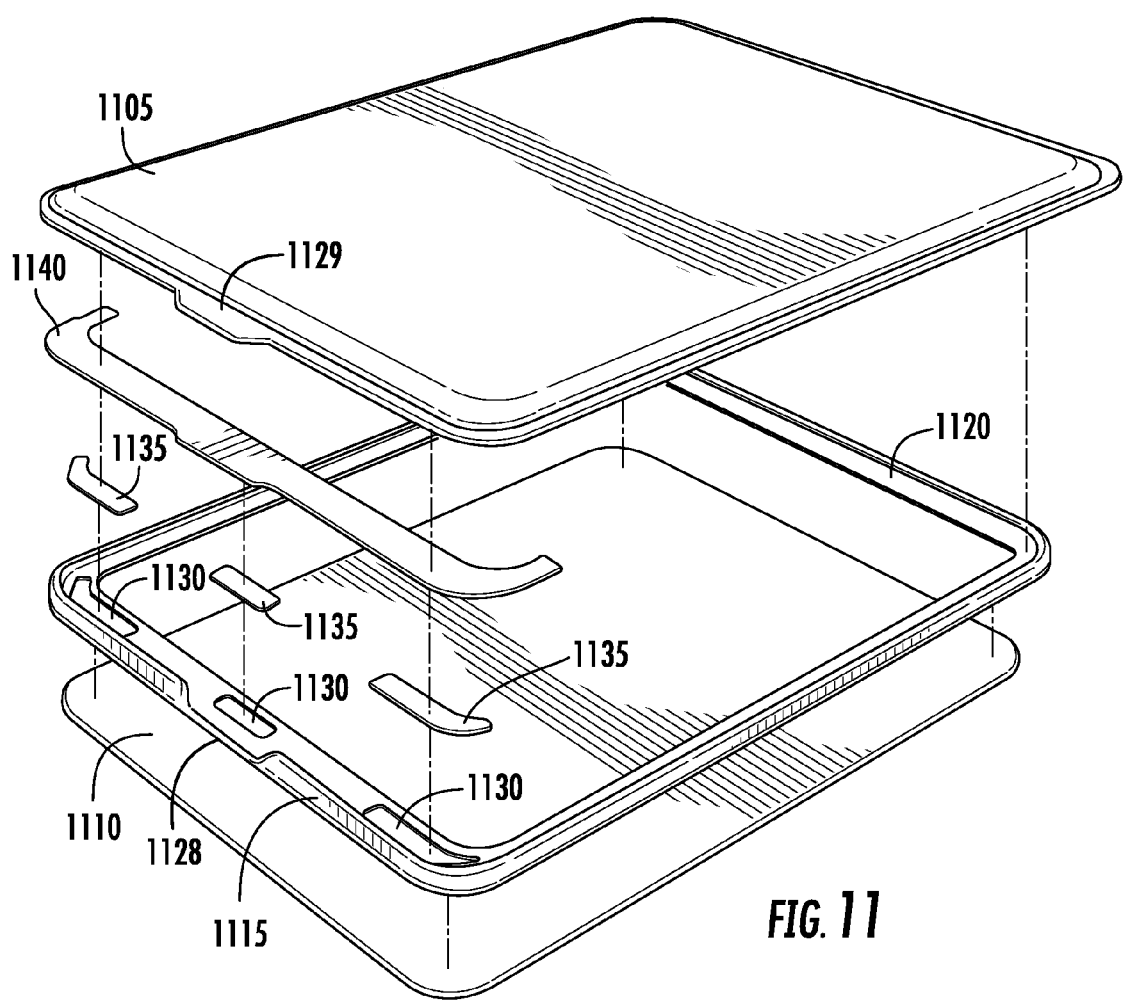
FIG. 11 shows an exploded parts view of the hybrid sleeve.

FIG. 11 shows an exploded parts view of the hybrid sleeve. There are a neoprene front panel 1105 and back panel 1110. The neoprene panels can have an inside lining, such as a faux fur interior. Other lining materials can be used including rubber, foams, or other cushion materials (see below for listing of materials). The neoprene panels can be laminated to the inside lining. The neoprene panel can also have exterior or interior pockets (not shown) to hold additional items. The case can also include rings, loops, eyes, or other attachment mechanisms (not shown) for a strap such as a shoulder strap.

Between the panels is an EVA protective frame 1115 that gives 360 degrees of protection. There is a recess 1120 along the EVA frame that holds the neoprene panels in place for sewing. In an implementation, the neoprene panels are attached by sewing to the EVA frame. The frame has a tab cut out 1128 in the EVA frame that is positioned opposite a tab 1129 of the front neoprene panel On a side for the opening of the sleeve, the EVA frame includes recesses 1130 for magnets 1135. There can be three magnets recesses for three magnets. There is a polycarbonate (PC) or neoprene (or other fabric or material such as nylon or polyester) panel 1140 that covers the magnet recesses. This panel can be relatively rigid. There can also be a fabric or other material that is attached (not shown) to the panel covering the magnets. This fabric or material can be a lining material that is glued to the panel that helps prevents scuffing or scratching of the electronic device by the case.

FIGS. 12A-12C show front, side, and bottom views of the EVA frame. The frame has a recess along the EVA frame to hold the neoprene panels in place for sewing. The frame has recesses for magnets. In this implementation, there are four recesses for up to four magnets. In various implementations, there can be any number magnets, such as one, two, three, four, or more magnets can be used.

Magnets do not need to be placed in every recess. If desired, three magnets (which would reduce manufacturing cost as compared to four) can be used in any three of the four recesses shown in FIG. 12A. Then one recess would remain empty. Alternatively, two magnets can be used, and placed in any two of the four recesses. Then two recesses would remain empty.

Further the number of recesses and magnets or their sizes or areas, or both, can depend on the sleeve or case design, especially the size of the opening. For larger or wider contents (e.g., notebook compared to tablet), the side opening of the sleeve opening will generally be larger. As the opening becomes larger or longer, more magnets can be used for the magnetic latching mechanism. For example, more magnets will be typically used for an opening along the longer side edge than the shorter side edge.

In a specific implementation, sleeves for tablet computers (e.g., iPad Air and iPad mini) have six magnets total, three for the frame and three for the front neoprene panel. Sleeve for notebook computers (MacBook 13-inch and 15-inch) have eight magnets total, four for the frame and four for the front neoprene panel. The frame in FIG. 12A is an example for a notebook while the frame in FIG. 11 is an example for a tablet.

Referring to FIG. 12B, as an option, a side (e.g., shorter side) of the sleeve can include a debossed logo (e.g., debossed leaf logo) to indicate a branding or manufacturer of the sleeve. The logo can be omitted.

In a specific implementation, a magnetic latch mechanism is used to secure the opening. But in other implementation, other types of latching or fastening mechanism can be used for the opening. Some examples of other mechanisms include zippers, hinges, snaps, buttons, hooks, bands, spring latches, cam latches, hook and loop (e.g., Velcro® by Velcro Industries B.V.), and many others. As an example, one side of the latch mechanism (e.g., positioned on the frame) can be a hook (or hook strip), while the other side (e.g., positioned on the panel) is a loop (or loop strip), or vice versa.

Additionally, the latching mechanism can be along a single side of the case, such as the shorter side of the rectangular case, the longer side of the rectangular case, a combination of a shorter side and a longer side, a combination of longer side and portions of two shorter sides, any three sides, or all four sides, or any combination.

Referring to FIG. 12A, the structure of frame 1205 (which can be referred to as a frame border) has four sides, a first side, second side, third side, and fourth side. The first side is adjacent to the second and fourth sides, and opposite of the third side. The second side is adjacent to the first and third sides, and opposite of the fourth side. The second side is longer than the first side. These sides of the frame border surround an open space 1223 which will form a compartment into which the device will be placed.

Figure 12D:
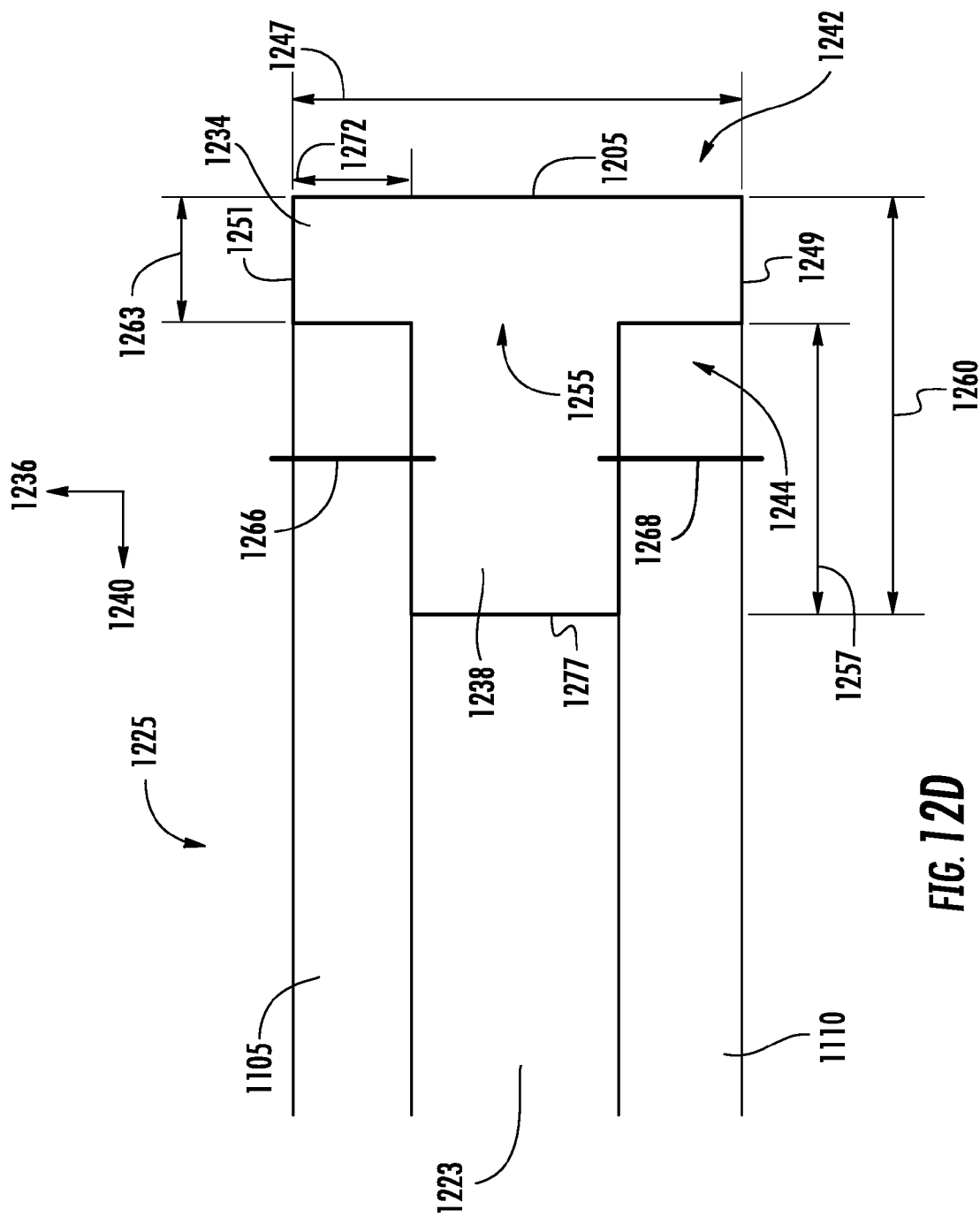
FIG. 12D shows a cross section of a side of a frame of the case.

FIG. 12D shows a cross section of the frame along a line 1225-1225. Cross sections of the frame along lines 1227-1227 and 1229-1229 will be similar to line 1225-1225. For example, the cross section of line 1225-1225 and 1229-1229 will be mirror images of each other. And line 1225-1225 is transverse to line 1227-1227.

The cross section of frame is T-shaped, having a first portion 1234 extending in a first direction 1236 and a second portion 1238 extending in a second direction 1240, transverse to the first direction. The first portion has an exterior side 1242 (which may be referred to as a bumper) and an interior side 1244. The first portion has a first length 1247 from a first end 1249 to a second end 1251 in the first direction. The frame bumper may be referred to as Tensaerlite™ protection technology.

The second portion is connected to the interior side of the first portion, at a point 1255 between the first and second ends. The second portion extends in the second direction away from the first portion a second length 1257. A length 1260 of the entire cross section includes length 1257 and a thickness 1263 of the first portion. This length can be also referred to as a frame border width.

FIG. 12D also shows panels 1105 and 1110 are attached to the frame. In an implementation, panel 1105 is attached to the frame via stitching 1266 on one side of the frame. Panel 1110 is attached to the frame via stitching 1268 on the other side of the frame. The stitching is positioned along length 1260 of the second portion. As discussed above, panels 1105 and 1110 can be attached to the frame by other techniques. Typically, the attachment means (e.g., glue or adhesive) will also be positioned along length 1260 of the second portion.

A distance 1272 between the second portion and end 1251 of the first portion provides a recess for panel 1105. So, after panel 1105 is attached to the frame, a top of panel 1105 (e.g., exterior surface) will be flush or almost flush with end 1251 of the frame. In an implementation, the top is the panel is slightly below (e.g., slightly lower) or slightly above (e.g., slight higher) end 1251 of the frame.

Similarly, the other side of the frame has a recess for panel 1110. Panel 1110 is typically the same thickness as panel 1105. So, a distance between end 1249 and the portion 1238 will be the same as distance 1272. However, different panel thicknesses can be used on the two sides. Then the distance between an end of the first portion and the second portion can be adjusted to accommodate the panel thickness in order to keep the exterior surface fo the panel about flush with the end. The distances between the end and the second portion can be different on different sides.

An end 1277 of the second portion has a relatively flat surface, rather than a pointed surface. The device placed inside the case will have its sides abutted or placed against end 1277. The flat surface (e.g., with its relatively larger surface area) avoids forming of high pressure point (e.g., such as a sharper point with relatively less surface area) that during impact could damage the device.

Instead of a flat surface, the shape of end 1277 can be designed to match the contours of the device for which the case is designed. For example, if the edge of the device is wedge shaped, the shape of end 1277 will be reverse edge shaped. If the edge of the device is rounded, the shape of end 1277 will be reverse rounded or concave.

Figure 12E:
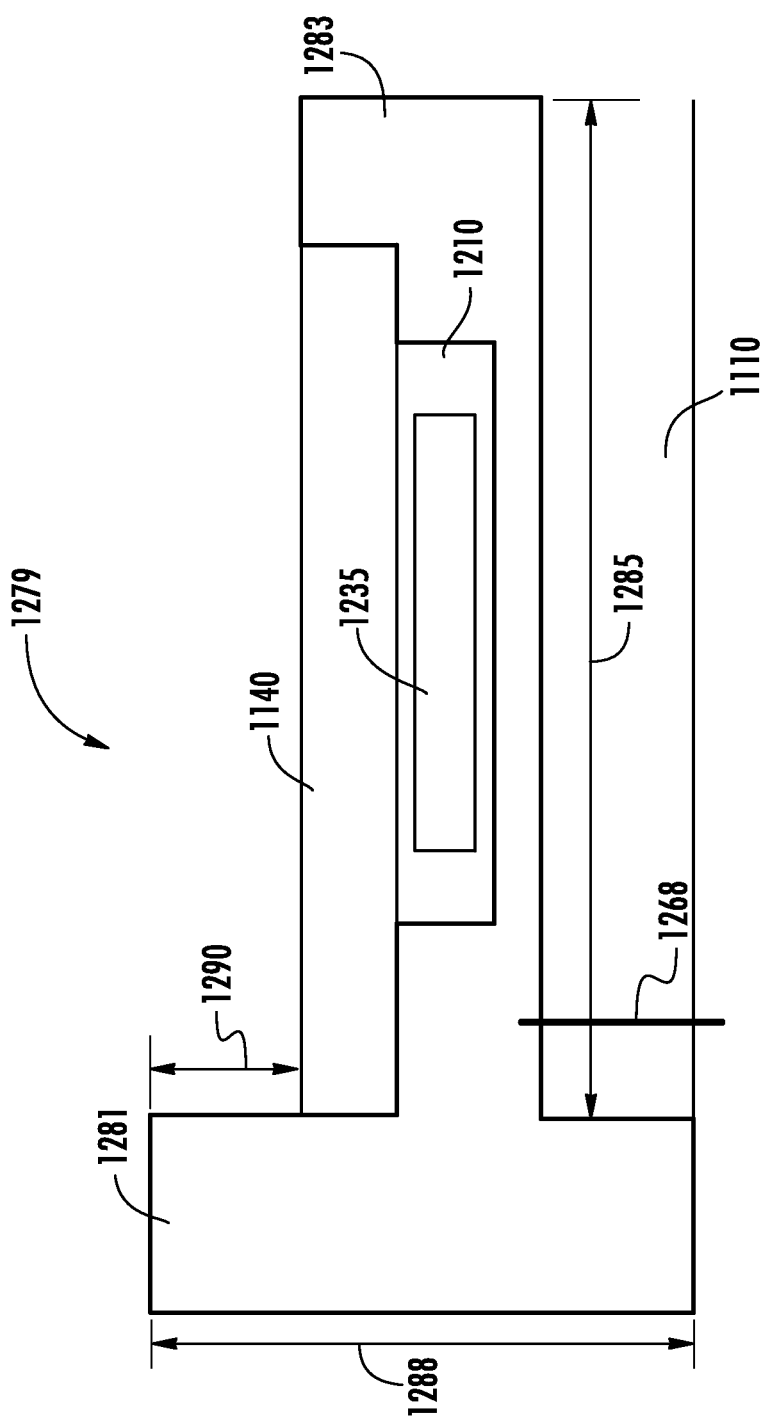
FIG. 12E shows another cross section of a side of a frame of case.

FIG. 12E shows a cross section of the frame along a line 1279-1279. This cross section is for the frame edge that forms the opening for the sleeve. This cross section is similar to cross section 1225 in FIG. 12D, but the panel 1105 is not fixedly attached to the frame edge by, for example, stitching or glue.

Cross section 1279 has a first portion 1281 and a second portion 1283. Second portion 1283 is different from second portion 1238 because the frame includes a recessed region 1210 which is for a magnet 1135. Recessed region 1210 is covered by magnet cover 1140 which holds the magnet in place.

In an implementation, to allow room for the magnet, a length 1285 can be longer than length 1257. A larger magnet having greater surface area will provide more magnetic attractive force to hold the opening closed, especially during impact.

In other implementations, length 1257 can be the same as or longer than length 1285. For example, length 1257 can be lengthened to be the same as or longer than length 1285. This will increase the shock absorption capability of the sides having a longer length 1257. Further, length 1285 can then be shortened to the same or less than length 1257. A different latching technology may be used, so that magnets are not needed, which will allow for a shorter length. Other implementations may have any combination of lengthening or shortening of length 1257 or 1285, or both.

In an implementation, a height 1288 of the first portion along the opening side edge is greater than a height 1247 along a side without the opening. This will allow a greater recess length 1290 (than length 1272) to accommodate the magnetic latching mechanism of panel 1105. So, while panel 1105 is magnetically latched to frame 1205, the surface of panel 1105 at the opening side will be flush or almost flush with an end of the first portion of the frame.

In other implementations, height 1247 can be the same as or greater than height 1288. Other implementations may have any combination of increasing or decreasing of height 1247 or 1288, or both. A greater height accommodates thicker panel material while maintaining a flush profile between the panel and frame edging. Generally greater higher also allows for greater shock absorption since there is more frame material for dissipating impact energy.

FIG. 12F shows a cross section magnetic latching mechanism of a panel along a line 1292-1292 (see FIG. 7). A magnet 1294 is attached to panel 1105 to form the magnetic latching mechanism. There can also be a magnet holder 1295 to position the magnet on panel 1105. A magnet cover 1296 covers magnet 1294 and holder 1295 and holds it in place on an interior surface of panel 1105. The magnet can be attached by sewing or an adhesive. To form the pull tab for the opening, a portion 1298 is made longer.

For cross section 1125 of FIG. 12D, table D below lists some frame dimensions for various products.

TABLE D

| Product | First Length 1247 (mm) | Second Length 1257 (mm) | Length 1260 (mm) | Thickness 1263 (mm) | Distance 1272 (mm) |
|---|---|---|---|---|---|
| Shorter Side Opening (e.g., ICON Sleeve for MacBook Pro 13" with Retina Display) | 11-12 | 8 | 11 | 3 | 4 |
| ICON Sleeve for iPad Mini 3 | 9-10 | 7 | 10 | 3 | 2 |
| Longer Side Opening (e.g., ICON Sleeve for MacBook Air 11") | 10-11 | 9 | 12 | 3 | 3 |

For cross section 1179 of FIG. 12E, table E below lists some frame dimensions for various products.

TABLE E

| Product | Length 1285 (mm) | Height 1288 (mm) | Recess Length 1290 (mm) |
|---|---|---|---|
| Case with Shorter Side Opening (e.g., ICON Sleeve for MacBook Pro 13" with Retina Display) | 19 | 12 | 3 |
| ICON Sleeve for iPad Mini 3 | 19 | 10 | 3 |
| Case with Longer Side Opening (e.g., ICON Sleeve for MacBook Air 11") | 21 | 12 | 3 |

For cross section 1292 of FIG. 12F, table F below lists some dimensions for various products.

TABLE F

| Product | Portion 1298 (mm) |
|---|---|
| Shorter Side Opening (e.g., ICON Sleeve for MacBook Pro 13" with Retina Display) | 5 |
| ICON Sleeve for iPad mini 3 | 5 |
| Longer Side Opening (e.g., ICON Sleeve for MacBook Air 11") | 5 |

Some specific flows and techniques are described for making a case of the invention, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data. Below is a sample flow for making a hybrid frame sleeve case.

1. An EVA frame, such as shown in FIG. 11 or 12A-12C, is formed by an injection molding process or other process used to form polymer materials. The frame has a shape of the shape of the case. In an implementation, the frame has a rectangular shape, two longer sides and two shorter sides, and rounded corners. The frame can also be referred to as a gasket bumper or bumper frame.

2. A rigid polycarbonate or neoprene (or other fabric or material such as nylon or polyester) panel, a cover for the magnets of the frame, is formed.

3. Front and back neoprene panels are formed. These can be cut and formed from a larger sheet of neoprene. The patterns for the front and back neoprene panels can be different such as the front panel having a tab, while the back panel does not. Or in other implementations, the panels can use the same pattern. The front and back panels can also be referred to as front and back panel guards.

4. Magnets are placed in recesses of the frame. These magnets are secured in place by the magnet cover. The cover can be attached by glue, epoxy, welding, fusing, lamination, or other technique for attaching polymers.

5. Magnets (or metal sheets) are attached to the front panel. There can be a cover (such a piece 712 in FIG. 7) that is placed over the magnets to hold them in place. These magnets or cover, or both, can be attached by sewing, glue, epoxy, welding, fusing, or other technique. Typically there are a number of magnets for the panel that is the same as a number of magnets in the frame.

6. A lining material can be attached to the front and back panels. In a specific implementation, the lining material is a faux fur. But the lining material can be other materials including foams that provide cushioning for inside of the case.

7. The front and back panels are attached to recesses in of the frame. These panels are attached to the frame along three sides, leaving of one of the shorter sides unattached for an opening of the case. The neoprene panels can be attached by sewing (e.g., using thread that goes through the frame), glue, epoxy, welding, fusing, or other technique for attaching these panels to the frame.

As described, in a specific implementation, the frame is made from an ethylene vinyl acetate or EVA. EVA is the copolymer of ethylene and vinyl acetate. The weight percent vinyl acetate usually varies from 10 to 40 percent, with the remainder being ethylene. EVA is often referred to as expanded rubber or foam rubber.

EVA is a polymer that approaches elastomeric materials in softness and flexibility, yet can be processed like other thermoplastics. The material has good clarity and gloss, low-temperature toughness, stress-crack resistance, hot-melt adhesive waterproof properties, and resistance to ultraviolet (UV) radiation. The EVA provides cushioning or padding for the sides of the hybrid sleeve.

In other implementations, other polymers other than EVA can be used instead of or in combination with EVA. For example, frame can be made an elastomer, elastic polymer, elastomeric compound, thermoplastic elastomer (TPE), polyvinyl chloride (PVC), polyurethane, polystyrene, rubber, silicone, and many others. An elastomer is a polymer with viscoelasticity (or "elasticity"), generally having low Young's modulus and high failure strain compared with other materials.

The frame material can be a foam (e.g., polymer or other substance with trapped bubbles) that provides cushioning or padding. Some examples of foam include quantum foam, polyurethane foam (foam rubber), XPS foam, polystyrene, phenolic, or many other manufactured foams. Other frame materials can include cork, carbonate, polycarbonate, thermoplastics, and thermoplastic polyurethane (TPU), in any combination. The frame materials may not be a foam or elastic like EVA, but have hard or rigid panel to absorb impacts instead of the contents of the case. The hard panel or surface (e.g., polycarbonate) can crack, shatter, or fracture on impact to distribute the energy of the impact. In an implementation, the cracked panels can be replaced with replacement panels. Or the entire case can be replaced after the impact-absorbing panels are spent due to an impact.

In an implementation, the front and back panels are made of neoprene. Neoprene or polychloroprene is a family of synthetic rubbers that are produced by polymerization of chloroprene. Neoprene provides cushioning and shock absorption for the device which the case protects.

In other implementations, the outer panels are made from other soft materials, such as fabric (e.g., cotton, wool, linen, polyester, microfiber, or fabric blends), ballistic nylon, woven carbon fiber, thermoplastic elastomer (TPE) material via a mold, other polymer, or others, in any combination. The fabrics can include fibers that are woven, nonwoven, or knitted. Other materials can be used including silicone, rubber, and many others. Other examples of materials include vinyl, polyvinyl chloride (PVC), plastic, thermoplastic, cloth, leather, suede, artificial leather, synthetic leather, synthetic leather made of plastic (sometimes referred to as pleather), poromeric imitation leather, koskin, leatherette, carbon fiber, air mesh, polyurethane (PU), welded polyurethane film, nylon, and polyester, in any combination.

In an implementation, the outer panels are made a nylon or polyester fabric that is environmentally friendly. The fabric can have a dope-dyed fiber, where the color originates from the addition of color chips in the process of polymerization. This avoids the dyeing process, which can causes unneeded pollution and greenhouse gases. A particular brand of dope-dyed fiber fabric is called Ecoya® from LIBOLON. The fabric for the panels can have a heathered pattern.

In an implementation, compared to the frame, the materials for the front and back panels are less rigid or more elastic than the frame. The soft panels (e.g., neoprene) can adapt or conform (e.g., stretch) to the surface and shape of the contents being held in sleeve. The frame is less elastic and has less stretch than the panels. The frame provides a structure for absorbing impacts and protecting the contents of the sleeve.

In an implementation, the frame structure is more shock absorbing than the panel material. To absorb shock, kinetic energy such as generated during the impact against the case is turned into heat and absorbed by the material instead of transferring the impact energy to the device being protected by the case. This frame structure is more rigid than the panel material, which allows in absorb more shock. The frame can be a foam, and the trapped bubbles in the foam act like compressible springs to absorb the shock. And then after the shock as been absorbed, the frame elastically returns to its original shape (e.g., the bubbles in the foam expand back to their original shape).

The panel material can also be a foam, but the spring constant (Hooke's law) for the compressible springs (bubbles) in the panel material is less than that for the frame. So, the panel material will not absorb as much kinetic energy as the frame.

The case can be made in any color, combination of colors, combination of hues, or combinations of colors and hues.

Figure 13:
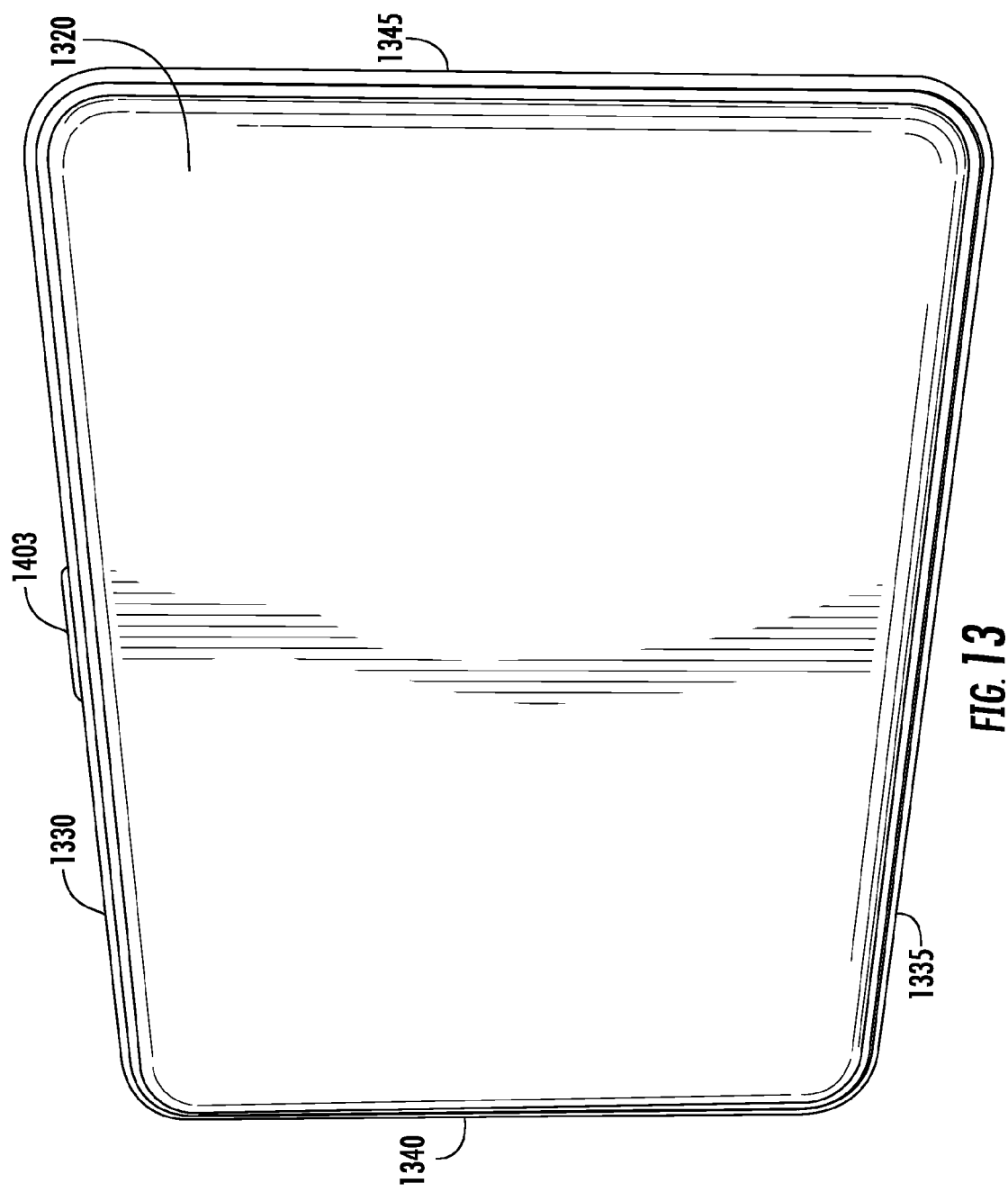
FIGS. 13-15 show another implementation of a hybrid sleeve case.
Figure 14:
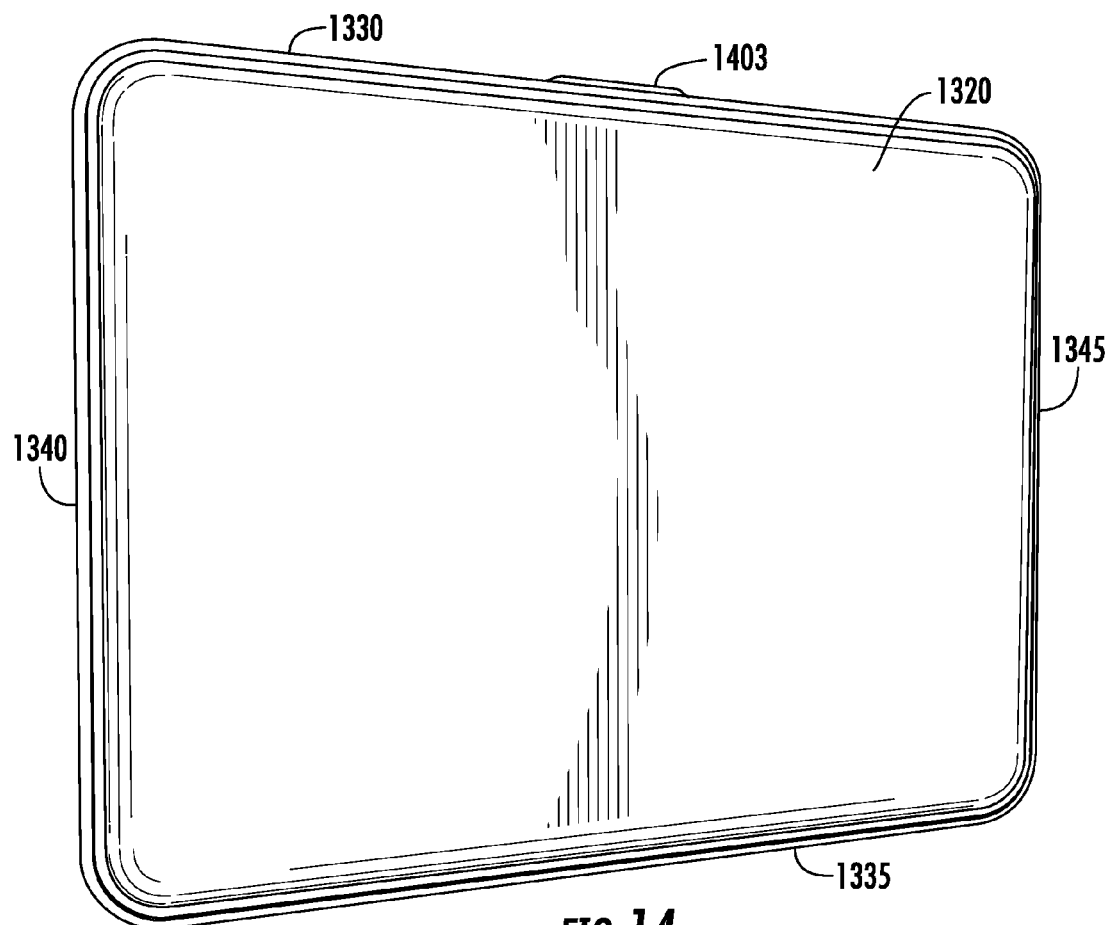
Figure 15:
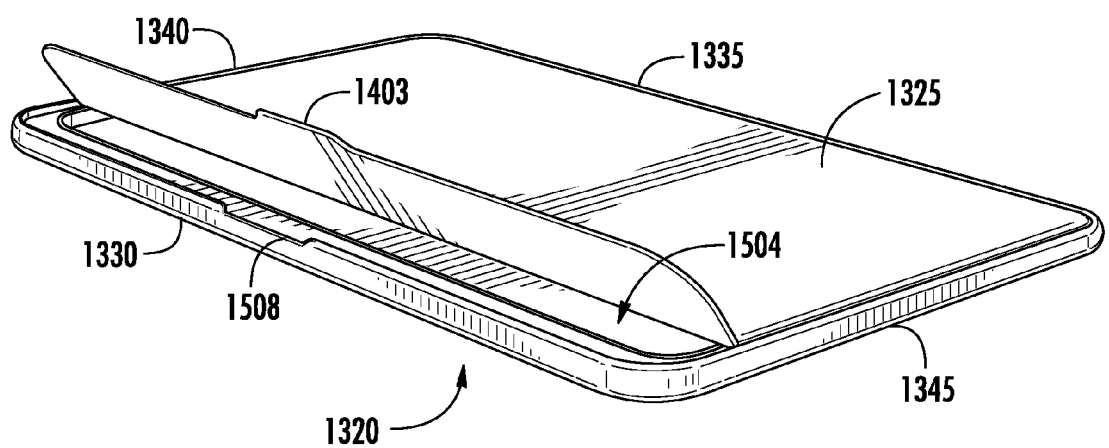

FIGS. 13-15 show another implementation of a hybrid sleeve case. This implementation is similar to the hybrid sleeve case described above. Instead of having an opening on the shorter side edge of the case, the opening for this hybrid sleeve case is on the longer side edge of the case. This case has a front panel 1320, back panel 1325, longer sides 1330 and 1335, and shorter sides 1340 and 1345. Longer side 1330 has a tab 1403 and opening 1504. FIG. 15 shows opening 1504 in an open position. A user can pull tab 1403 to open the opening. When closed, tab 1403 is inserted into a tab cut out 1508.

Figure 16A:
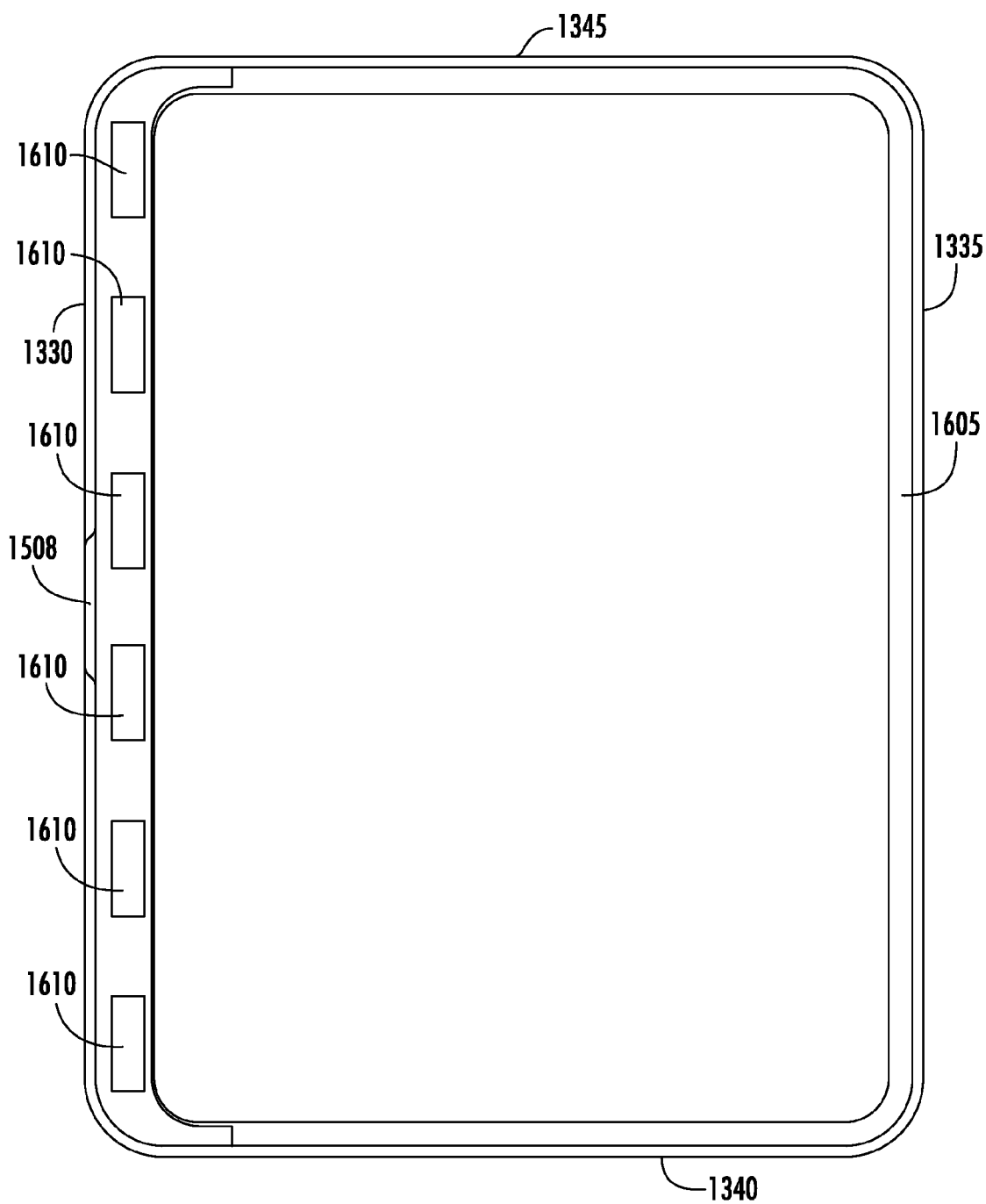
FIGS. 16A-16F show a frame for another implementation of a hybrid sleeve case.
Figure 16B:
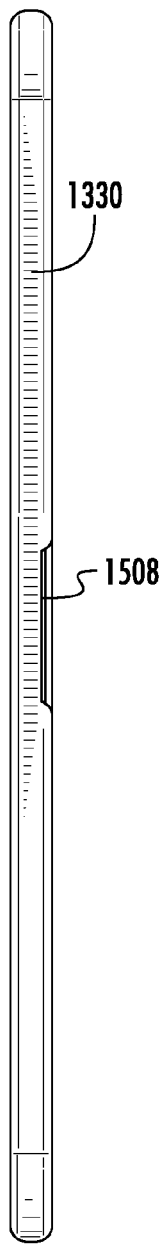
Figure 16E:
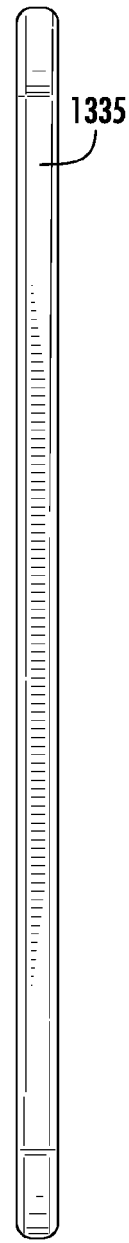
Figure 16C:
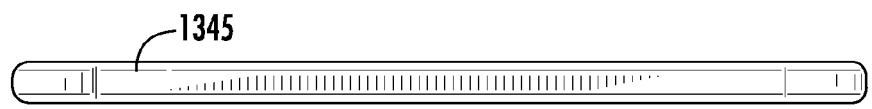
Figure 16D:
Figure 16F:
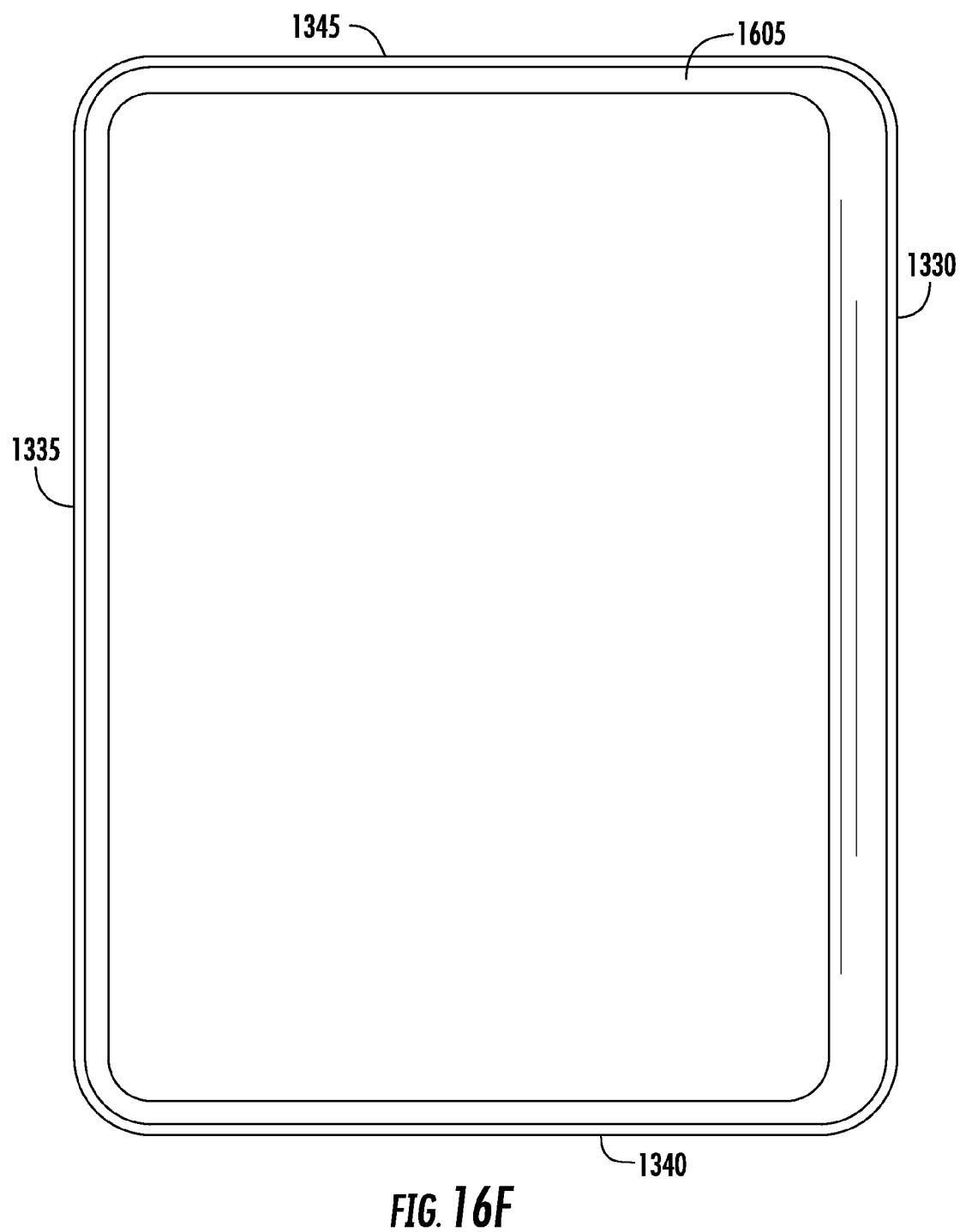

FIGS. 16A-16F show a frame 1605 for the hybrid sleeve case. This frame is similar to frame 1205 described in FIGS. 12A-12F above. FIG. 16A shows a first side of the frame and magnet recesses along a longer edge of the frame, rather than the shorter edge of the frame as in FIG. 12A. FIG. 16B shows a longer side edge of the frame where the opening will be. There is a tab cut out 1508. FIGS. 16C-16D shows shorter side edge of the frame. FIG. 16E shows a longer side edge of the frame, opposite to the side edge in FIG. 16B. FIG. 16F shows a second side of the frame.

Figure 19:
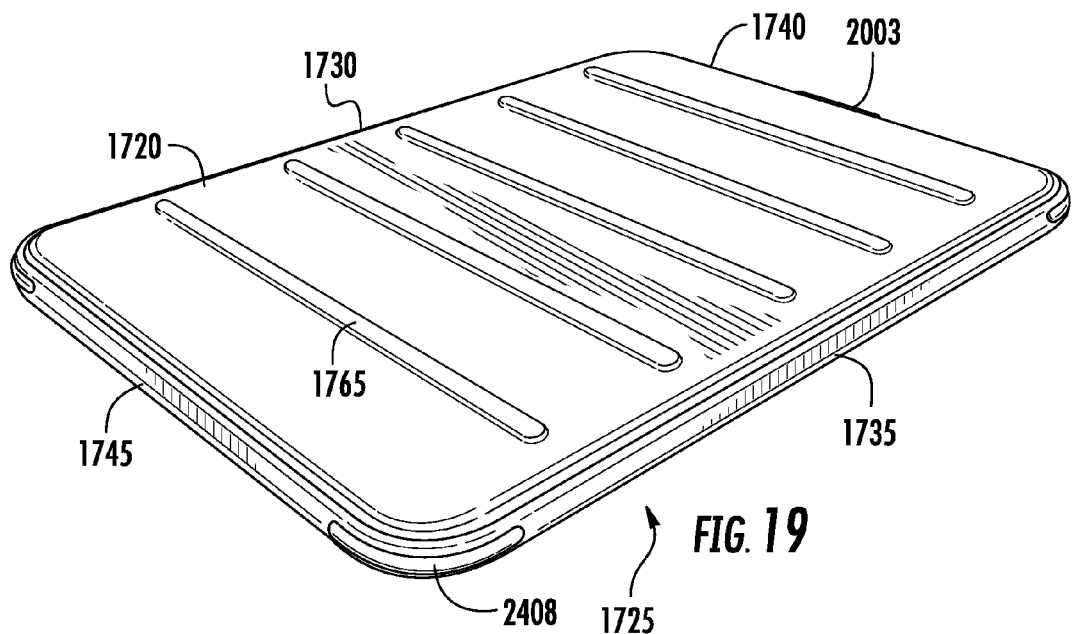
Figure 20:
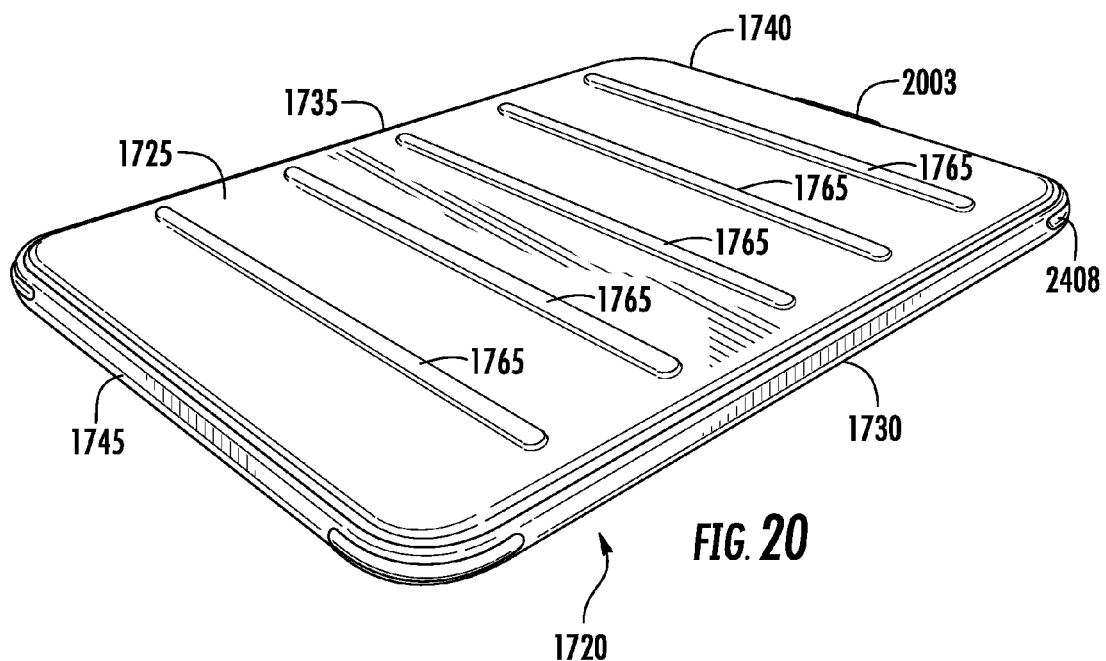
Figure 21:
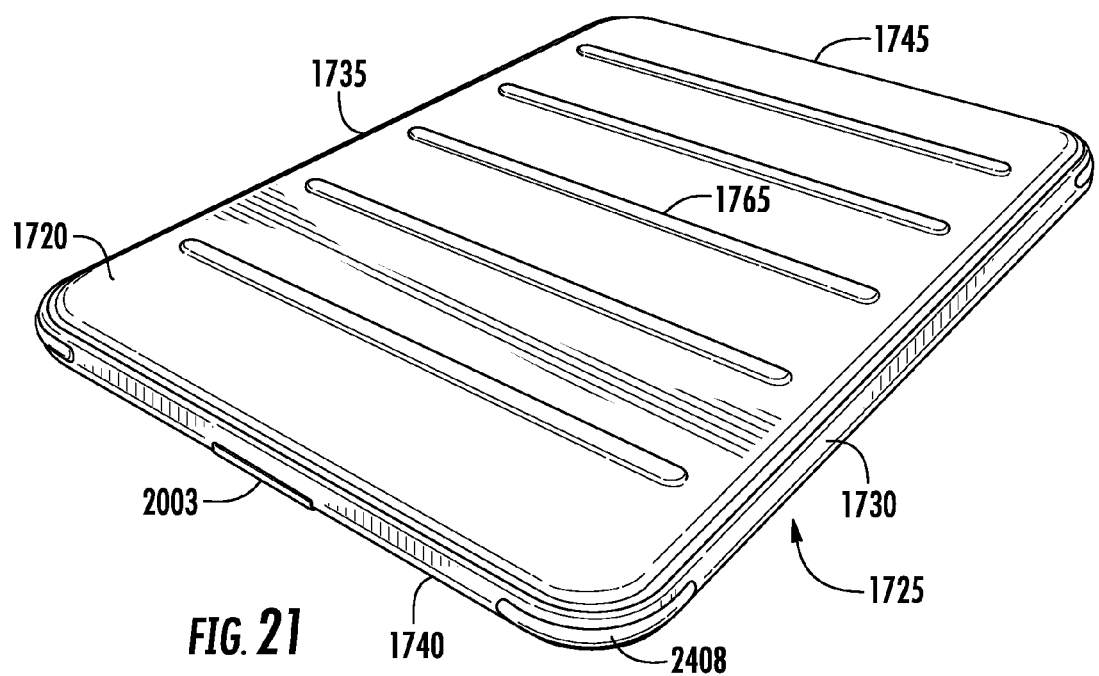
Figure 22:
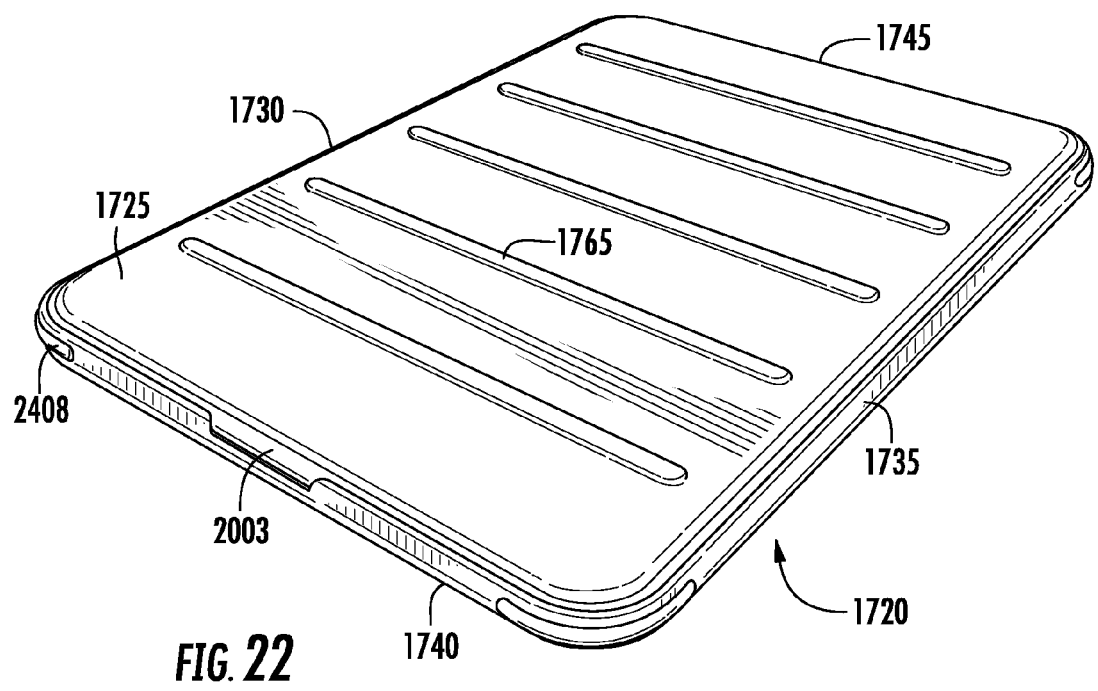
Figure 23:
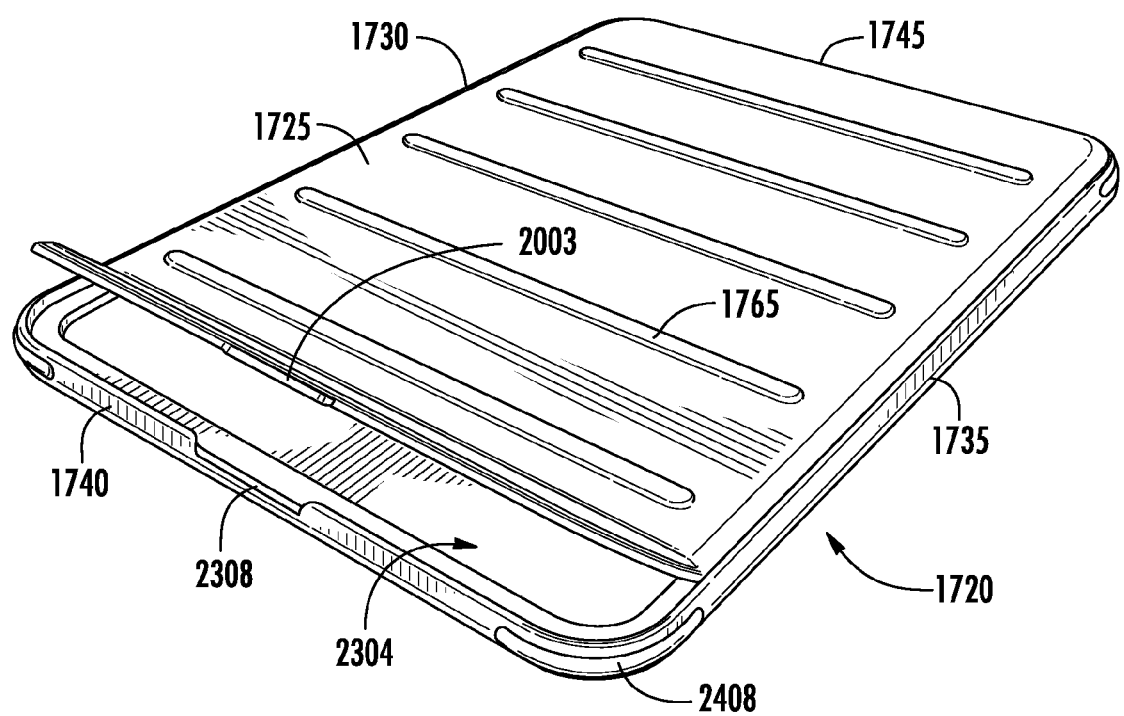

FIGS. 17-24 show a specific implementation of a hybrid sleeve case. The case has a front 1720, back 1725, sides 1730 and 1735, and sides 1740 and 1745 that are shorter than sides 1730 and 1735. Shorter side 1740 has a tab and opening. FIG. 17 shows a top view of the front side. FIG. 18 shows side 1730. FIG. 19 shows a perspective view of the front with side 1740 positioned forward. FIG. 20 shows a perspective view of the back with side 1735 positioned forward with tab 2003. FIG. 21 shows a perspective view of the front with side 1730 positioned forward. FIG. 22 shows a perspective view of the back with side 1730 positioned forward and tab 2003. FIG. 23 shows a perspective view of the back with the opening 2304 lifted open and a tab cutout 2308.

Figure 24:
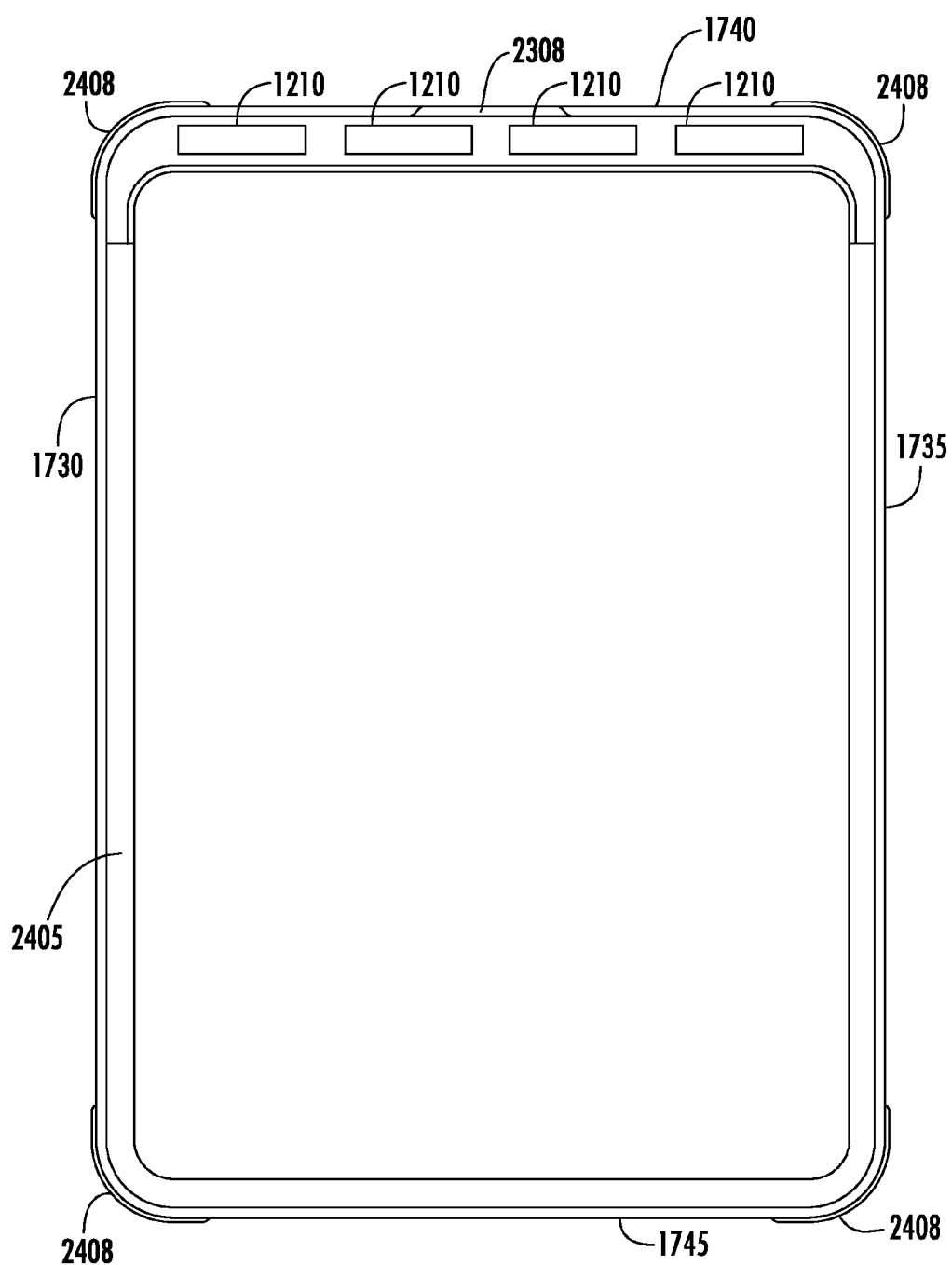

FIG. 24 shows an EVA protective frame 2405 for the hybrid sleeve case. Sides 1730, 1735, 1740, and 1745 of the hybrid case are formed by the EVA frame. As discussed above, such as for FIG. 12A, the frame has recesses 1210 for magnets. Additionally, EVA frame 2405 has reinforced corners 2408, where an additional layer is added to the EVA at the corner, or the EVA layer is created to have a thicker portion. The additional layer can be EVA or other materials that have been previously discussed for the EVA frame. The reinforced corners of this hybrid are visible in FIGS. 17-23. The reinforced corner may be referred to as a bumper or corner bumper. The corner bumpers can additional protection and cushioning for the corners of the case.

In an implementation, corner bumpers are part of the mold for the EVA frame. In another implementation, corner bumpers are attached to the EVA frame. The corner bumpers can be attached to the frame, for example, by gluing, fusing, or other methods.

In an implementation, the corner bumpers are made of EVA. In other implementations, the corner bumpers can also be made of PU, rubber, and others. The corner bumper can be made of the same material as the EVA frame. In another implementation, the corner bumper is made of a different material from the EVA frame.

While four corner bumpers are shown in this figure, there can be more or less bumpers. For example, each corner can have two corner bumpers. However, each corner does not have to have the same size bumpers, the same number of bumpers, or use the same material for bumpers.

For this hybrid sleeve case implementation, the front and back panels for frame 2405 have raised rails 1765. Like the corner bumpers, the raised rails 1765 can provide additional protection and cushioning for the case.

In an implementation, the raised rails are attached to only the front panel of the case. In another implementation, the raised rails are attached to only the back panel of the case. In another implementation, the raised rails are attached to both front and back panels of the case.

The raised rails shown here are rectangular prisms that approximately span the shorter side the case. In other implementations, the raised rails can be different shapes, such as cylinders and triangles. The raised rails can also be oriented such that they are attached like legs of a table.

Figure 25:
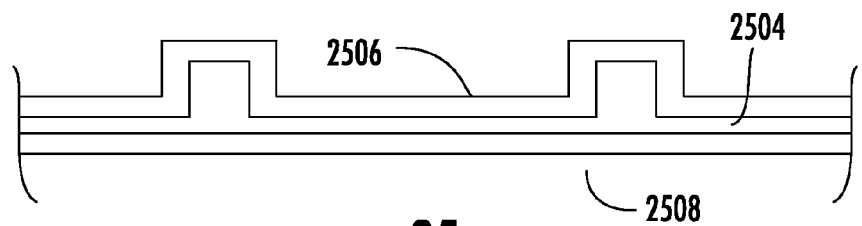
FIG. 25 shows a cross section of rails of a panel of an implementation of a hybrid sleeve case.

FIG. 25 shows a cross section of rails of a panel of an implementation of a hybrid sleeve case. A rail structure layer 2504 is positioned an exterior layer 2506 and interior layer 2508. The rail structure layer provides the rail structure. In an implementation, the layers are laminated together. In another implementation, the three layers are attached together by an adhesive. The rail structure can be made from a polymer material such as EVA and exterior and interior layers are fabric, such as nylon or polyester, or a material such as neoprene This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A case for a portable electronic device comprising:
   a frame structure comprising a frame border having an exterior edge and interior edge, the exterior and interior edges being separated by a frame border width, wherein the frame structure comprises a first material, and the interior edge surrounds a perimeter of a compartment for the portable electronic device;
   a first side panel, coupled to a first side of the frame border, wherein the first side panel comprises a second material, different from the first material;
   a second side panel, coupled to a second side of the frame border, wherein the second panel comprises the second material, the first material is more shock absorbing than the second material, and the first material comprises ethylene vinyl acetate and the second material comprises neoprene,
   whereby sides of the portable electronic device are cushioned against side impacts by the first material having a thickness of the frame border width.

2. The case of claim 1 wherein the first material comprises a foam ethylene vinyl acetate.

3. A case for a portable electronic device comprising:
   an ethylene vinyl acetate (EVA) frame comprising:
   a first side, second side, third side, and fourth side, wherein the first side is adjacent to the second and fourth sides, and opposite of the third side, the second side is adjacent to the first and third sides, and opposite of the fourth side, and the second side is longer than the first side,
   a cross section of the second side comprises a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a point between the first and second ends, and extends in the second direction away from the first portion a second length;
   a compartment formed by the first, second, third, and fourth sides, wherein first and third sides of the compartment are bounded by the first and third sides that extend in the second direction, and second and fourth sides of the compartment are bounded by the second and fourth sides that extend a third direction, transverse to the second direction;
   first neoprene panel, coupled to an upper side of the EVA frame;
   a second neoprene panel, coupled to a lower side of the EVA frame, wherein the lower side of the EVA frame is opposite of the upper side, and the compartment is bounded on opposite sides by the first and second neoprene panels.

4. The case of claim 3 wherein the second length is greater than the first length.

5. The case of claim 3 wherein a cross section of the first side comprises a third portion extending in the first direction and a fourth portion extending in a third direction, transverse to the first direction,
   wherein the third portion comprises an exterior side and an interior side, the fourth portion is coupled to the interior side of the third portion, at a point between the third and fourth ends, and extends in the third direction away from the third portion a third length, and the third length is greater than the second length.

6. The case of claim 5 wherein the fourth portion comprises a recessed region, and the recessed region is shaped to hold a magnet.

7. The claim of claim 5 wherein the third portion has a fourth length from a third end to a fourth end in the first direction, and the fourth length is greater than the first length.

8. The claim of claim 5 wherein the third portion has a fourth length from a third end to a fourth end in the first direction, and the fourth length is the same as the first length.

9. The case of claim 3 wherein the compartment is an enclosed space that retains the portable electronic device.

10. The case of claim 3 comprising:
a first latching mechanism, coupled to the second neoprene panel; and
a second latching mechanism, coupled to the first side of the EVA frame, wherein the second latching mechanism is adapted to mate with the first latching mechanism,
an opening to the compartment is open when the first and second latching mechanisms are unlatched, and
the opening to the compartment is closed when the first and second latching mechanisms are latched together.

11. The case of claim 3 comprising:
a first latching mechanism, coupled to the second neoprene panel; and
a second latching mechanism, coupled to the second side of the EVA frame, wherein the second latching mechanism is adapted to mate with the first latching mechanism,
an opening to the compartment is open when the first and second latching mechanisms are unlatched, and
the opening to the compartment is closed when the first and second latching mechanisms are latched together.

12. The case of claim 3 comprising:
a first magnetic latch, coupled to the second neoprene panel; and
a second magnetic latch, coupled to the EVA frame, wherein an opening to the compartment is open when the first and second magnetic latches are separated from each other, and the opening to the compartment is closed when the first and second magnetic latches are coupled together via magnetic attraction.

13. The case of claim 3 wherein the first neoprene panel is sewn to the upper side of the EVA frame, and the second neoprene panel is sewn to the lower side of the EVA frame.

14. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material; and
coupling a second side panel to a second side of the frame border, wherein the second panel comprises the second material, and the first material is more shock absorbing than the second material, whereby sides of the portable electronic device are cushioned against side impacts by the first material having a thickness of the frame border width,
wherein the frame structure comprises a cross section comprising a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a point between the first and second ends, and extends in the second direction away from the first portion a second length.

15. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material; and
coupling a second side panel to a second side of the frame border, wherein the second panel comprises the second material, and the first material is more shock absorbing than the second material, whereby sides of the portable electronic device are cushioned against side impacts by the first material having a thickness of the frame border width,
wherein the frame structure comprises ethylene vinyl acetate foam, and the first and second side panels comprise neoprene.

16. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material;
coupling a second side panel to a second side of the frame border, wherein the second panel comprises the second material, and the first material is more shock absorbing than the second material, whereby sides of the portable electronic device are cushioned against side impacts by the first material having a thickness of the frame border width; and
forming a recess in the frame structure for a magnet, wherein the recess extends from the first side of the frame border into the first material, toward the second side of the frame border.

17. The method of claim 14 comprising:
coupling a first latching mechanism to the second side panel; and
coupling a second latching mechanism to the frame at a position to latch with the first latching mechanism of the second side panel.

18. The method of claim 14 wherein the frame structure extends around a side perimeter of the case formed by the method.

19. The method of claim 15 comprising:
coupling a first latching mechanism to the second side panel; and
coupling a second latching mechanism to the frame at a position to latch with the first latching mechanism of the second side panel.

20. The method of claim 15 wherein the frame structure extends around a side perimeter of the case formed by the method.

21. The method of claim 16 comprising:
coupling a first latching mechanism to the second side panel; and
coupling a second latching mechanism to the frame at a position to latch with the first latching mechanism of the second side panel.

22. The method of claim 16 wherein the frame structure extends around a side perimeter a case formed by the method.

23. The case of claim 3 wherein the first neoprene panel is coupled via stitching to the upper side of the EVA frame, and the second neoprene panel is coupled via stitching to the lower side of the EVA frame.

24. The case of claim 3 wherein the first neoprene panel comprises an opening flap, the opening flap extends about parallel to a first side of the EVA frame, and the portable electronic device is inserted through an opening, accessible via the opening flap, into the compartment of the case and removed from the compartment through the opening.

25. The case of claim 3 wherein the EVA frame comprises a first shock absorption characteristic, and the first neoprene panel comprises a second shock absorption characteristic.

26. The case of claim 3 wherein the EVA frame is more shock absorbing than the second material from the first neoprene panel.

27. The case of claim 1 wherein the first side panel is coupled via stitching to the first side of the frame structure.

28. The case of claim 27 wherein the second side panel is coupled via stitching to the second side of the frame structure.

29. The case of claim 1 wherein the frame structure comprises a cross section comprising a first portion extending in a first direction and a second portion extending in a second direction, transverse to the first direction,
the first portion comprises an exterior side and an interior side, and the first portion has a first length from a first end to a second end in the first direction, and
the second portion is coupled to the interior side of the first portion, at a point between the first and second ends, and extends in the second direction away from the first portion a second length.

30. The case of claim 1 wherein a first spring constant for the first material is greater than a second spring constant for the second material.

31. The case of claim 1 wherein the first material comprises a greater rigidity than the second material.

32. A case for a portable electronic device comprising:
a frame structure comprising a frame border having an exterior edge and interior edge, the exterior and interior edges being separated by a frame border width, wherein the frame structure comprises a first material, and the interior edge surrounds a perimeter of a compartment for the portable electronic device;
a first side panel, coupled to a first side of the frame border, wherein the first side panel comprises a second material, different from the first material;
a second side panel, coupled to a second side of the frame border, wherein the second panel comprises the second material, the first material is more shock absorbing than the second material, and the first material comprises ethylene vinyl acetate and the second material comprises neoprene,
whereby sides of the portable electronic device are cushioned against side impacts by the first material.

33. The case of claim 32 wherein the first material comprises a foam ethylene vinyl acetate.

34. The case of claim 32 wherein the first side panel is coupled via stitching to the first side of the frame structure.

35. The case of claim 34 wherein the second side panel is coupled via stitching to the second side of the frame structure.

36. The case of claim 32 wherein the frame structure comprises a cross section comprising a first portion extending in a first direction and a second portion extending in a second direction, transverse to the first direction,
the first portion comprises an exterior side and an interior side, and the first portion has a first length from a first end to a second end in the first direction, and
the second portion is coupled to the interior side of the first portion, at a point between the first and second ends, and extends in the second direction away from the first portion a second length.

37. The case of claim 32 wherein a first spring constant for the first material is greater than a second spring constant for the second material.

38. The case of claim 32 wherein the first material comprises a greater rigidity than the second material.

39. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material; and
coupling a second side panel to a second side of the frame border, wherein the second panel comprises the second material, and the first material is more shock absorbing than the second material, whereby sides of the portable electronic device are cushioned against side impacts by the first material,
wherein the frame structure comprises a cross section comprising a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a point between the first and second ends, and extends in the second direction away from the first portion a second length.

40. The method of claim 39 comprising:
coupling a first latching mechanism to the second side panel; and coupling a second latching mechanism to the frame at a position to latch with the first latching mechanism of the second side panel.

41. The method of claim 39 wherein the frame structure extends around a side perimeter of the case formed by the method.

42. The method of claim 39 wherein the coupling of the first side panel to the first side of the frame border comprises stitching.

43. The method of claim 42 wherein the coupling of the second side panel to the second side of the frame border comprises stitching.

44. The method of claim 39 wherein the coupling of the first side panel to the first side of the frame border comprises stitching, and the first material comprises ethylene vinyl acetate foam.

45. The method of claim 44 wherein the second material comprises neoprene.

46. The method of claim 39 wherein the first material comprises a first spring constant, and the second material comprises a second spring constant.

47. The method of claim 39 wherein the first material comprises a greater rigidity than the second material.

48. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material; and
coupling a second side panel to a second side of the frame border, wherein the second panel comprises the second material, whereby sides of the portable electronic device are cushioned against side impacts by the first material,
wherein the frame structure comprises a cross section comprising a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a point between the first and second ends, and extends in the second direction away from the first portion a second length.

49. The method of claim 48 comprising:
coupling a first latching mechanism to the second side panel; and
coupling a second latching mechanism to the frame at a position to latch with the first latching mechanism of the second side panel.

50. The method of claim 48 wherein the frame structure extends around a side perimeter of the case formed by the method.

51. The method of claim 48 wherein the coupling of the first side panel to the first side of the frame border comprises stitching.

52. The method of claim 51 wherein the coupling of the second side panel to the second side of the frame border comprises stitching.

53. The method of claim 48 wherein the coupling of the first side panel to the first side of the frame border comprises stitching, and the first material comprises ethylene vinyl acetate foam.

54. The method of claim 53 wherein the second material comprises neoprene.

55. The method of claim 48 wherein the first material comprises a first spring constant, and the second material comprises a second spring constant.

56. The method of claim 48 wherein the first material comprises a greater rigidity than the second material.

57. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material; and
coupling a second side panel to a second side of the frame border, wherein the second panel comprises the second material, and the first material is more shock absorbing than the second material, whereby sides of the portable electronic device are cushioned against side impacts by the first material,
wherein the frame structure comprises ethylene vinyl acetate foam, and the first and second side panels comprise neoprene.

58. The method of claim 57 wherein the frame structure comprises a cross section comprising a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a position between the first and second ends, and extends in the second direction away from the first portion a second length.

59. The method of claim 57 comprising:
coupling a first latching mechanism to the second side panel; and
coupling a second latching mechanism to the frame at a position to latch with the first latching mechanism of the second side panel.

60. The method of claim 57 wherein the frame structure extends around a side perimeter of the case formed by the method.

61. The method of claim 57 wherein the coupling of the first side panel to the first side of the frame border comprises stitching.

62. The method of claim 41 wherein the coupling of the second side panel to the second side of the frame border comprises stitching.

63. The method of claim 57 wherein the coupling of the first side panel to the first side of the frame border comprises stitching, and the first material comprises ethylene vinyl acetate foam.

64. The method of claim 63 wherein the second material comprises neoprene.

65. The method of claim 57 wherein the first material comprises a first spring constant, and the second material comprises a second spring constant.

66. The method of claim 57 wherein the first material comprises a greater rigidity than the second material.

67. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material; and
coupling a second side panel to a second side of the frame border, wherein the second panel comprises the second material, whereby sides of the portable electronic device are cushioned against side impacts by the first material,
wherein the frame structure comprises ethylene vinyl acetate foam, and the first and second side panels comprise neoprene.

68. The method of claim 67 wherein the frame structure comprises a cross section comprising a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a position between the first and second ends, and extends in the second direction away from the first portion a second length.

69. The method of claim 67 comprising:
coupling a first latching mechanism to the second side panel; and
coupling a second latching mechanism to the frame at a position to latch with the first latching mechanism of the second side panel.

70. The method of claim 67 wherein the frame structure extends around a side perimeter of the case formed by the method.

71. The method of claim 67 wherein the coupling of the first side panel to the first side of the frame border comprises stitching.

72. The method of claim 71 wherein the coupling of the second side panel to the second side of the frame border comprises stitching.

73. The method of claim 67 wherein the coupling of the first side panel to the first side of the frame border comprises stitching, and the first material comprises ethylene vinyl acetate foam.

74. The method of claim 73 wherein the second material comprises neoprene.

75. The method of claim 67 wherein the first material comprises a first spring constant, and the second material comprises a second spring constant.

76. The method of claim 67 wherein the first material comprises a greater rigidity than the second material.

77. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material;
coupling a second side panel to a second side of the frame border, wherein the second panel comprises the second material, and the first material is more shock absorbing than the second material, whereby sides of the portable electronic device are cushioned against side impacts by the first material; and
forming a recess in the frame structure for a magnet, wherein the recess extends from the first side of the frame border into the first material, toward the second side of the frame border.

78. The method of claim 77 wherein the frame structure comprises a cross section comprising a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a position between the first and second ends, and extends in the second direction away from the first portion a second length.

79. The method of claim 77 comprising:
coupling a first latching mechanism to the second side panel; and
coupling a second latching mechanism to the frame at a position to latch with the first latching mechanism of the second side panel.

80. The method of claim 77 wherein the frame structure extends around a side perimeter of the case formed by the method.

81. The method of claim 77 wherein the coupling of the first side panel to the first side of the frame border comprises stitching.

82. The method of claim 81 wherein the coupling of the second side panel to the second side of the frame border comprises stitching.

83. The method of claim 77 wherein the coupling of the first side panel to the first side of the frame border comprises stitching, and the first material comprises ethylene vinyl acetate foam.

84. The method of claim 83 wherein the second material comprises neoprene.

85. The method of claim 77 wherein the first material comprises a first spring constant, and the second material comprises a second spring constant.

86. The method of claim 77 wherein the first material comprises a greater rigidity than the second material.

87. A method comprising:
providing a frame structure for a case for a portable electronic device comprising a frame border having an exterior edge and interior edge, wherein the frame structure comprises a first material;
separating the exterior and interior edges by a frame border width;
using the interior edge of the frame structure to surround a perimeter of a compartment for the portable electronic device;
coupling a first side panel to a first side of the frame border, wherein the first side panel comprises a second material, different from the first material;
coupling a second side panel to a second side of the frame border, wherein the second panel comprises the second material, whereby sides of the portable electronic device are cushioned against side impacts by the first material; and forming a recess in the frame structure for a magnet, wherein the recess extends from the first side of the frame border into the first material, toward the second side of the frame border.

88. The method of claim 87 wherein the frame structure comprises a cross section comprising a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a position between the first and second ends, and extends in the second direction away from the first portion a second length.

89. The method of claim 87 comprising:
coupling a first latching mechanism to the second side panel; and
coupling a second latching mechanism to the frame at a position to latch with the first latching mechanism of the second side panel.

90. The method of claim 87 wherein the frame structure extends around a side perimeter of the case formed by the method.

91. The method of claim 87 wherein the coupling of the first side panel to the first side of the frame border comprises stitching.

92. The method of claim 91 wherein the coupling of the second side panel to the second side of the frame border comprises stitching.

93. The method of claim 87 wherein the coupling of the first side panel to the first side of the frame border comprises stitching, and the first material comprises ethylene vinyl acetate foam.

94. The method of claim 93 wherein the second material comprises neoprene.

95. The method of claim 87 wherein the first material comprises a first spring constant, and the second material comprises a second spring constant.

96. The method of claim 87 wherein the first material comprises a greater rigidity than the second material.

97. A case for a portable electronic device comprising:
a frame structure comprising a frame border having an exterior edge and interior edge, the exterior and interior edges being separated by a frame border width, wherein the frame structure comprises a first material, and the interior edge surrounds a perimeter of a compartment for the portable electronic device;
a first side panel, coupled to a first side of the frame border, wherein the first side panel comprises a second material, different from the first material;
a second side panel, coupled to a second side of the frame border, wherein the second panel comprises the second material, the first material is more shock absorbing than the second material, and the first material comprises ethylene vinyl acetate and the second material comprises neoprene.

98. The case of claim 97 wherein sides of the portable electronic device are cushioned against side impacts by the first material.

99. The case of claim 97 wherein the first material comprises a foam ethylene vinyl acetate.

100. The case of claim 97 wherein the frame structure comprises a first side, second side, third side, and fourth side, the first side is adjacent to the second and fourth sides, and opposite of the third side,
the second side is adjacent to the first and third sides, and opposite of the fourth side, and
the second side is longer than the first side.

101. The case of claim 97 wherein a cross section of a side of the frame border comprises:
a first portion extending in a first direction and a second portion extending in a second direction, transverse to the first direction, wherein the first portion comprises an exterior side and an interior side, the first portion has a first length from a first end to a second end in the first direction, and the second portion is coupled to the interior side of the first portion, at a point between the first and second ends, and extends in the second direction away from the first portion a second length.

102. The case of claim 101 wherein the second length of the second portion of the cross section is greater than the first length of the first portion.

103. The case of claim 97 wherein the first side panel comprises an opening flap, the opening flap extends about parallel to the first side of the frame, and the portable electronic device is inserted through an opening, accessible via the opening flap, into the compartment of the case and removed from the compartment through the opening.

104. The case of claim 97 wherein the first side panel comprises an opening flap, the opening flap extends about parallel to the second side of the frame, and the portable electronic device is inserted through an opening into the compartment of the case and removed from the compartment through the opening.

105. The case of claim 97 comprising
an opening to the compartment for the portable electronic device, wherein the opening is formed between
a first magnetic latch member, coupled to the first side panel, and
a second magnetic latch member, coupled to the first side of the frame border, wherein an opening to the compartment is open when the first and second magnetic latch members are separated from each other, and the opening to the compartment is closed when the first and second magnetic latch members are coupled together magnetically.

106. The case of claim 97 wherein the first side panel is coupled to the first side of the frame border via stitching, and the second side panel is coupled to the second side of the frame border via stitching.

107. A case for a portable electronic device comprising:
a frame structure comprising a frame border having an exterior edge and interior edge, the exterior and interior edges being separated by a frame border width, wherein the frame structure comprises a first material, and the interior edge surrounds a perimeter of a compartment for the portable electronic device;
a first side panel, coupled to a first side of the frame border, wherein the first side panel comprises a second material, different from the first material; and
a second side panel, coupled to a second side of the frame border, wherein the second panel comprises the second material, and the first material comprises ethylene vinyl acetate and the second material comprises neoprene.

108. The case of claim 107 wherein sides of the portable electronic device are cushioned against side impacts by the first material.

109. The case of claim 107 wherein the first material comprises a foam ethylene vinyl acetate.

110. The case of claim 107 wherein the frame structure comprises a first side, second side, third side, and fourth side,
   the first side is adjacent to the second and fourth sides, and opposite of the third side,
   the second side is adjacent to the first and third sides, and opposite of the fourth side, and
   the second side is longer than the first side.

111. The case of claim 107 wherein a cross section of a side of the frame border comprises:
   a first portion extending in a first direction and a second portion extending in a second direction, transverse to the first direction, wherein the first portion comprises an exterior side and an interior side, the first portion has a first length from a first end to a second end in the first direction, and the second portion is coupled to the interior side of the first portion, at a point between the first and second ends, and extends in the second direction away from the first portion a second length.

112. The case of claim 107 wherein the second length of the second portion of the cross section is greater than the first length of the first portion.

113. The case of claim 107 wherein the first side panel comprises an opening flap, the opening flap extends about parallel to the first side of the frame, and the portable electronic device is inserted through an opening into the compartment of the case and removed from the compartment through the opening.

114. The case of claim 107 wherein the first side panel comprises an opening flap, the opening flap extends about parallel to the second side of the frame, and the portable electronic device is inserted through an opening into the compartment of the case and removed from the compartment through the opening.

115. The case of claim 107 comprising
   an opening to the compartment for the portable electronic device, wherein the opening is formed between
   a first magnetic latch member, coupled to the first side panel, and
   a second magnetic latch member, coupled to the first side of the frame border, wherein an opening to the compartment is open when the first and second magnetic latch members are separated from each other, and the opening to the compartment is closed when the first and second magnetic latch members are coupled together magnetically.

116. The case of claim 107 wherein the first side panel is coupled to the first side of the frame border via stitching, and the second side panel is coupled to the second side of the frame border via stitching.

117. A case for a portable electronic device comprising:
   a frame structure comprising a frame border having an exterior edge and interior edge, the exterior and interior edges being separated by a frame border width, wherein the frame structure comprises a first material, and the interior edge surrounds a perimeter of a compartment for the portable electronic device;
   a first side panel, coupled to a first side of the frame border, wherein the first side panel comprises a second material, different from the first material;
   a second side panel, coupled to a second side of the frame border, wherein the second panel comprises the second material, and the first material comprises ethylene vinyl acetate foam and the second material comprises neoprene,
   the frame structure comprises a first side, second side, third side, and fourth side, wherein the first side is adjacent to the second and fourth sides, and opposite of the third side, the second side is adjacent to the first and third sides, and opposite of the fourth side, and the second side is longer than the first side,
   a cross section of a side of the frame border comprises a first portion extending in a first direction and a second portion extending in a second direction, transverse to the first direction, wherein the first portion comprises an exterior side and an interior side, the first portion has a first length from a first end to a second end in the first direction, and the second portion is coupled to the interior side of the first portion, at a point between the first and second ends, and extends in the second direction away from the first portion a second length, and
   the first side panel is coupled to the first side of the frame border via stitching, and the second side panel is coupled to the second side of the frame border via stitching.

118. The case of claim 117 wherein sides of the portable electronic device are cushioned against side impacts by the first material.

119. The case of claim 117 wherein the first side panel comprises an opening flap, the opening flap extends about parallel to the first side of the frame, and the portable electronic device is inserted through an opening, accessible via the opening flap, into the compartment of the case and removed from the compartment through the opening.

120. The case of claim 117 wherein the first side panel comprises an opening flap, the opening flap extends about parallel to the second side of the frame, and the portable electronic device is inserted through an opening, accessible via the opening flap, into the compartment of the case and removed from the compartment through the opening.

121. A method comprising:
   providing a frame structure for a case for a portable electronic device comprising a frame border having an exterior edge and interior edge, wherein the frame structure comprises a first material;
   separating the exterior and interior edges by a frame border width;
   using the interior edge of the frame structure to surround a perimeter of a compartment for the portable electronic device;
   coupling a first side panel to a first side of the frame border, wherein the first side panel comprises a second material, different from the first material; and
   coupling a second side panel to a second side of the frame border, wherein the second panel comprises the second material,
   wherein the frame structure comprises a cross section comprising a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a point between the first and second ends, and extends in the second direction away from the first portion a second length,
   the frame structure comprises ethylene vinyl acetate foam, and the first and second side panels comprise neoprene,
   the coupling of the first side panel to the first side of the frame border comprises stitching, and
   the coupling of the second side panel to the second side of the frame border comprises stitching.

122. The method of claim 121 wherein sides of the portable electronic device are cushioned against side impacts by the first material.

123. The case of claim 121 wherein the first side panel comprises an opening flap, the opening flap extends about parallel to a first edge of the frame structure, and the portable electronic device is inserted through an opening, accessible via the opening flap, into the compartment of the case and removed from the compartment through the opening.

124. The case of claim 121 wherein the first edge of the frame structure is transverse to a second edge of the frame structure, and the first edge is shorter than the second edge.

125. The case of claim 121 wherein the first edge of the frame structure is transverse to a second edge of the frame structure, and the first edge is longer than the second edge.

126. A case for a portable electronic device comprising:
an ethylene vinyl acetate (EVA) frame comprising:
a first side, second side, third side, and fourth side, wherein the first side is adjacent to the second and fourth sides, and opposite of the third side, the second side is adjacent to the first and third sides, and opposite of the fourth side, and the second side is longer than the first side,
a cross section of the second side comprises a first portion extending in a first direction and a second portion extending in a second direction, transverse to the first direction, wherein the first portion comprises an exterior side and an interior side, and the first portion has a first length from a first end to a second end in the first direction, and the second portion is coupled to the interior side of the first portion, at a point between the first and second ends, and extends in the second direction away from the first portion a second length,
a compartment formed by the first, second, third, and fourth sides, wherein first and third sides of the compartment are bounded by the first and third sides that extend in the second direction, and second and fourth sides of the compartment are bounded by the second and fourth sides that extend a third direction, transverse to the second direction;
a first neoprene panel, coupled to a first side of the EVA frame; and
a second neoprene panel, coupled to a second side of the EVA frame, wherein the second side of the EVA frame is opposite of the first side, and the compartment is bounded on opposite sides by the first and second neoprene panels,
the first neoprene panel is coupled via stitching to the first side of the EVA frame, and the second neoprene panel is coupled via stitching to the second side of the EVA frame, and
the first neoprene panel comprises an opening flap, the opening flap extends about parallel to a first side of the EVA frame.

127. The case of claim 126 wherein the portable electronic device is inserted through an opening, accessible via the opening flap, into the compartment of the case and removed from the compartment through the opening.

128. The case of claim 126 wherein the EVA frame comprises a first shock absorption characteristic, and the first neoprene panel comprises a second shock absorption characteristic.

129. The case of claim 126 wherein the EVA frame is more shock absorbing than the second material from the first neoprene panel.

* * * * *